(12) United States Patent
Peng et al.

(10) Patent No.: US 10,559,322 B2
(45) Date of Patent: Feb. 11, 2020

(54) DIAGNOSTIC TAPE CARTRIDGE PATTERNED WITH PREDETERMINED HEAD-MEDIA SPACINGS FOR TESTING A TAPE HEAD OF A TAPE DRIVE

(71) Applicant: QUANTUM CORPORATION, San Jose, CA (US)

(72) Inventors: James P. Peng, Santa Maria, CA (US); Turguy Goker, Solana Beach, CA (US); Hoa Le, Orange, CA (US); Suayb S. Arslan, Sariyer/Istanbul (TR); George A. Saliba, Boulder, CO (US)

(73) Assignee: QUANTUM CORPORATION, San Jose, CA (US)

( * ) Notice: Subject to any disclaimer, the term of this patent is extended or adjusted under 35 U.S.C. 154(b) by 0 days.

(21) Appl. No.: 16/246,668

(22) Filed: Jan. 14, 2019

(65) Prior Publication Data
US 2019/0221234 A1 Jul. 18, 2019

Related U.S. Application Data

(60) Provisional application No. 62/617,540, filed on Jan. 15, 2018.

(51) Int. Cl.
| | | |
|---|---|---|
| *G11B 20/18* | (2006.01) | |
| *G11B 5/008* | (2006.01) | |
| *G11B 5/41* | (2006.01) | |
| *G11B 20/12* | (2006.01) | |

(52) U.S. Cl.
CPC ...... *G11B 20/1833* (2013.01); *G11B 5/00878* (2013.01); *G11B 5/41* (2013.01); *G11B 20/1211* (2013.01); *G11B 2020/1275* (2013.01)

(58) Field of Classification Search
None
See application file for complete search history.

(56) References Cited

U.S. PATENT DOCUMENTS

| | | | | | |
|---|---|---|---|---|---|
| 4,893,209 | A | * | 1/1990 | Siddiq | G11B 5/1871 360/128 |
| 5,612,827 | A | * | 3/1997 | Morita | G11B 5/41 360/25 |
| 9,418,686 | B1 | * | 8/2016 | Biskeborn | G11B 5/40 |
| 2004/0264025 | A1 | * | 12/2004 | Ishiguro | G11B 5/584 360/48 |

(Continued)

*Primary Examiner* — Peter Vincent Agustin
(74) *Attorney, Agent, or Firm* — Roeder & Broder LLP; James P. Broder

(57) ABSTRACT

A diagnostic tape (318) for use with a tape drive (310) having a tape head (322) includes a first tape section (430A) and a second tape section (430B). The first tape section (430A) and the second tape section (430B) are configured to move across the tape head (322) during use of the tape drive (310). The first tape section (430A) includes a first patterned data code (432A) that is indicative of a first spacing between the tape head (322) and the first tape section (430A). The second tape section (430B) includes a second patterned data code (432B) that is indicative of a second spacing between the tape head (322) and the second tape section (430B). The second patterned data code (432B) is different than the first patterned data code (432A). The diagnostic tape (318) can further include a tape head cleaning section (630F) including abrasive material (650) that is configured to move across the tape head (322) to clean the tape head (322).

26 Claims, 7 Drawing Sheets

(56) References Cited

U.S. PATENT DOCUMENTS

| | | | | |
|---|---|---|---|---|
| 2006/0087759 A1* | 4/2006 | Evans | .................... | G11B 20/10 360/48 |
| 2012/0287535 A1* | 11/2012 | Saliba | ...................... | G11B 5/41 360/132 |
| 2019/0221234 A1* | 7/2019 | Peng | .................. | G11B 20/1833 |

* cited by examiner

DIAGNOSTIC TAPE CARTRIDGE PATTERNED WITH PREDETERMINED HEAD-MEDIA SPACINGS FOR TESTING A TAPE HEAD OF A TAPE DRIVE

RELATED APPLICATION

This application claims priority on U.S. Provisional Application Ser. No. 62/617,540, filed on Jan. 15, 2018, and entitled "DIAGNOSTIC TAPE CARTRIDGE PATTERNED WITH PREDETERMINED HEAD-MEDIA SPACINGS FOR TESTING A TAPE HEAD OF A TAPE DRIVE". As far as permitted, the contents of U.S. Provisional Application Ser. No. 62/617,540 are incorporated in their entirety herein by reference.

BACKGROUND

Magnetic tape libraries continue to be a key storage tier in data storage infrastructure. In a typical magnetic tape library, there can be hundreds to thousands of tape drives. In order to be able to use the magnetic tape library most efficiently and effectively, it is desired that each tape drive be maintained in peak performance to record and retrieve data for as long a period as possible. For purposes of maintaining the tape drive in such peak performance, it is recognized that the tape head in the tape drive is one of the most critical components that affects performance.

During use of the tape drive, the tape head of the tape drive is configured to be in direct contact with tape from a tape cartridge so that data can be written on and read from the tape as the tape moves across the tape head at high speed. This movement of the tape across the tape head creates friction, while also allowing dust and other particles from the surface of the tape to hone the tape head and collect and build a layer of contaminants, e.g., dust, debris, etc., on the surface of the tape head. Over time, this build-up of the layer of dust, debris, etc. on the surface of the tape head creates excessive separation (also sometimes referred to herein equivalently and alternatively as "spacing loss" or "increased spacing") between the tape head and the tape. As a result of this excessive separation between the tape head and the tape, the transmission of data between the tape and the tape head begins to degrade until such point that the tape drive is eventually unusable due to an intolerable level of bit errors.

FIG. 1 is a graphical illustration of a theoretical relationship between bit error rate and signal-to-noise ratio for a prior art tape drive, i.e. for a theoretical tape drive. More specifically, FIG. 1 illustrates a theoretical curve 100 that demonstrates such a theoretical relationship, with bit error rate (BER) represented along the Y-axis, and the signal-to-noise ratio (SNR) represented along the X-axis. As shown in the theoretical curve 100 illustrated in FIG. 1, as the SNR of the tape drive increases, the BER decreases.

It is appreciated that BER can also be calculated from SNR in terms of a departure curve. As utilized herein, a "departure curve" is a theoretical curve where BER can be calculated from SNR using random independent errors, also called a complementary error function ("erfc"). For a given channel model such as PR4, the BER can be defined as, $$BER = K/2 \times erfc(\sqrt{SNR/2}), \text{ for some constant } K \geq 1 \quad \text{(Equation 1)}$$

Additionally, FIG. 2 is a graphical illustration of a representative relationship between bit error rate and signal-to-noise ratio for an actual prior art tape drive. In particular, FIG. 2 illustrates a series of actual curves 202 that demonstrate such an actual relationship, with bit error rate (BER) again represented along the Y-axis, and the signal-to-noise ratio (SNR) again represented along the X-axis. Further, as shown in FIG. 2, the X-axis can be used additionally or alternatively to represent spacing loss (or excessive separation) between the tape head and the tape calculated according to the Wallace Equation in magnetic recording theory, with the value of the spacing loss decreasing (going from high-to-low) with movement from left-to-right in the graph.

As further illustrated in FIG. 2, the actual relationship between BER and SNR (or spacing loss) in an actual tape drive reaches a floor level for BER as the SNR increases or the spacing loss decreases to a certain point. Stated in another manner, as opposed to the theoretical curve 100 illustrated in FIG. 1, it is recognized and seen in a real tape drive that the realized BER only decreases to a certain level (i.e. there will always be some errors) regardless of how high the SNR gets (or how low the spacing loss gets). Additionally, as noted in FIG. 2, the floor of the actual curve 202 can vary greatly due to many factors that are seen within the environment in which the tape drive is operating as well as within the tape drive itself. Thus, FIG. 2 illustrates three actual curves, i.e. a first actual curve 202A, a second actual curve 202B, and a third actual curve 202C, that each have a different floor value for how low the BER actually goes. FIG. 2 further shows that regardless of the particular floor for the BER, each of the actual curves 202A-202C demonstrates that tape drive (and tape head) performance essentially degrades together once the SNR gets sufficiently low, or the spacing loss gets sufficiently high.

Also shown in FIG. 2 is a representative operation point 204 (illustrated as a vertical line that crosses each of the actual curves 202A, 202B, 202C). The representative operation point 204 illustrated in FIG. 2 indicates that the tape drive at such operation point includes a good tape head that is operating with a reduced spacing loss and corresponding low BER. Stated in another manner, at the representative operation point 204 illustrated in FIG. 2, the actual curves 202A, 202B, 202C are all effectively at their floors as far as the BER. Horizontal arrow 206, which extends to the left away from the representative operation point 204, indicates the change of performance as the SNR decreases and/or the spacing loss increases. However, because the actual representative operation point 204 is along the flat section of the curve 202A, 202B, 202C, even with a fairly sizable increase in spacing loss, the impact on the BER at this point is still very small.

To prevent those problems which may be caused by excessive separation between the tape head and the tape, the standard approach is to periodically clean the tape head with a cleaning cartridge. In various applications, the cleaning cartridge uses abrasive tape to clean the tape head. In particular, once a cleaning cartridge is loaded into a tape drive, the more abrasive tape in the cleaning cartridge moves across the tape head and contacts the tape head. Consequently, the abrasive tape in the cleaning cartridge scrapes away the build-up of the layer of dust, debris, etc. that has been created on the tape head such that the excessive separation between the tape head and the tape is reduced. Sometimes it can take multiple uses of the cleaning cartridge to fully eliminate the excessive separation between the tape head and the tape. Unfortunately, excessive use of the cleaning cartridge can generate surface scratches and create pole tip recession, which is an unrecoverable permanent separation between the tape and the tape head (or sensor).

Thus, it is appreciated that to maintain longevity of the tape drive and the tape head with higher performance, an operator must vigilantly avoid the two undesirable extremes within the tape drive: excessive separation between the tape head and the tape, and pole tip recession. In order to best avoid such undesirable extremes, it is critical to only apply the cleaning process at the right time and in the correct amount. Currently, that is very difficult in the field operation mode for at least a few reasons, as noted below.

First, the stain build-up process is a complicated nonlinear process that depends on the media type, usage model, and environmental conditions. Thus, the time and the number of cleanings required can be hard to predict. For example, the recommended cleaning period in the specifications of a tape drive, as well as cleaning signals (e.g., in tape_alerts log page) that may be built into the tape drive, often result in cleaning operations that occur too early and too often (which can prematurely lead to pole tip recession) or too late and not often enough (which can result in hard error failure).

Second, the tape drive adaptive channel is very capable of coping with some level of spacing loss. In particular, before the excessive separation between the tape head and the tape reaches a certain critical value (or pivotal point), overall performance of the tape drive may show no change or only insignificant impact during periods of excessive separation between the tape head and the tape. This occurs when the spacing loss (or SNR) effectively corresponds to the floor level for BER, e.g., such as shown along each curve 202A, 202B, 202C in FIG. 2. Unfortunately, once the excessive separation reaches and/or exceeds a pivotal point (i.e. where the actual curve 202A, 202B, 202C starts to move upward fairly rapidly as you move along the actual curve 202A, 202B, 202C from right-to-left), only a relatively small increase in the separation between the tape head and the tape can cause extreme performance degradation.

Third, in a laboratory setting, spacing between the tape head and the tape can be directly measured or indirectly implied through advanced instruments in a controlled environment with a specific setup. However, in field operations, the tape drive may have only a few performance related logs available. Additionally, it is further understood that changes in performance of the tape drive can also be caused by many other factors such as differences in drive, media, or environmental conditions such as temperature, humidity etc. Each of these other factors can have a similar or even greater magnitude of influence on the performance of the tape drive. Any performance changes observed in the tape drive can come from any or all of those factors, and it can be hard to differentiate which portion of performance degradation is due to which cause. Thus, it is difficult to accurately discern when performance of a cleaning operation is truly warranted in such conditions.

SUMMARY

The present invention is directed toward a diagnostic tape for use with a tape drive having a tape head. In various embodiments, the diagnostic tape includes a first tape section and a second tape section. The first tape section is configured to move across the tape head during use of the tape drive. The first tape section includes a first patterned data code that is indicative of a first spacing between the tape head and the first tape section. The second tape section is also configured to move across the tape head during use of the tape drive. The second tape section includes a second patterned data code that is indicative of a second spacing between the tape head and the second tape section. The second patterned data code is different than the first patterned data code.

Additionally, in various embodiments, each of the first patterned data code and the second patterned data code includes formatted data that is interspersed with unformatted data. Further, in some such embodiments, the formatted data is arranged diagonally along a length of the diagnostic tape.

In certain embodiments, the diagnostic tape further includes a third tape section that is configured to move across the tape head during use of the tape drive. The third tape section includes a third patterned data code that is indicative of a third spacing between the tape head and the third tape section. Additionally, the third patterned data code is different than the first patterned data code and the second patterned data code. In some such embodiments, the diagnostic tape further includes a fourth tape section that is configured to move across the tape head during use of the tape drive. The fourth tape section includes a fourth patterned data code that is indicative of a fourth spacing between the tape head and the fourth tape section. The fourth patterned data code is different than the first patterned data code, the second patterned data code and the third patterned data code. Further, in certain embodiments, the diagnostic tape also includes a fifth tape section that is configured to move across the tape head during use of the tape drive. The fifth tape section includes a fifth patterned data code that is indicative of a fifth spacing between the tape head and the fifth tape section. Additionally, the fifth patterned data code is different than the first patterned data code, the second patterned data code, the third patterned data code and the fourth patterned data code.

Additionally, in some embodiments, the tape drive further includes a servo head. In such embodiments, the diagnostic tape can further include a third tape section that is configured to move across the servo head during use of the tape drive, the third tape section including a third patterned data code that is indicative of a spacing between the servo head and the third tape section, the third patterned data code being different than the first patterned data code and the second patterned data code.

Further, in certain embodiments, the first tape section can be positioned substantially adjacent to the second tape section along a length of the diagnostic tape.

In some embodiments, the diagnostic tape further includes a tape head cleaning section that is configured to move across the tape head during use of the tape drive. The tape head cleaning section is configured to clean the tape head as the tape head cleaning section moves across the tape head. In one such embodiment, the tape head cleaning section includes abrasive material formed along a surface of the diagnostic tape. Alternatively, in another such embodiment, the tape head cleaning section includes diamond-like abrasive material formed along a surface of the diagnostic tape. Still alternatively, in yet another such embodiment, the tape head cleaning section includes wavy lapping tape.

Additionally, in various such embodiments, the tape head cleaning section is positioned toward an end along the length of the diagnostic tape, such that the tape head cleaning section comes after each of the tape sections that include the patterned data codes. For example, in such embodiments, the first tape section can be positioned adjacent to the second tape section along a length of the diagnostic tape; and the tape head cleaning section can be positioned after the first tape section and the second tape section along the length of the diagnostic tape. With such design, the tape head will not be unnecessarily exposed to the tape head cleaning section, e.g., the abrasive material of the tape head cleaning section, while reading from or writing to the tape sections for purposes of determining the spacing between the tape head and the tape. Further, the effectiveness of the tape head cleaning section, when utilized, can then be retested by going back to the tape sections with the patterned data codes toward the start along the length of the diagnostic tape.

Additionally and/or alternatively, in certain such embodiments, the first tape section and the second tape section comprise a first data block; the diagnostic tape further includes a second data block that includes a plurality of second block tape sections, with each second block tape section having a different patterned data code that is indicative of a different spacing between the tape head and the respective second block tape section; and the tape head cleaning section is positioned between the first data block and the second data block along a length of the diagnostic tape.

The present invention is further directed toward a combination including a tape drive having a tape head, and the diagnostic tape as described above that is selectively usable within the tape drive. In some embodiments, the tape head is configured to (i) read the first patterned data code from the first tape section to generate first information relevant to an actual spacing between the tape head and the diagnostic tape, and (ii) read the second patterned data code from the second tape section to generate second information relevant to the actual spacing between the tape head and the diagnostic tape. Additionally, the combination can further include a controller including a processor that is configured to estimate the actual spacing between the tape head and the diagnostic tape using at least the first information and the second information.

Additionally, the present invention is further directed toward a combination including (A) a tape drive having a tape head; (B) a diagnostic tape including (i) a first tape section that moves across the tape head during use of the tape drive, the first tape section including a first patterned data code, the tape head reading the first patterned data code from the first tape section to generate first information; and (ii) a second tape section that moves across the tape head during use of the tape drive, the second tape section including a second patterned data code that is different than the first patterned data code, the tape head reading the second patterned data code from the second tape section to generate second information; and (C) a controller including a processor that estimates an actual spacing between the tape head and the diagnostic tape using at least the first information and the second information.

Further, in certain applications, the present invention is also directed toward a method for estimating an actual spacing between a tape and a tape head during use of a tape drive that includes the tape head, including the steps of (A) providing a diagnostic tape including (i) a first tape section including a first patterned data code that is indicative of a first spacing between the tape head and the first tape section, and (ii) a second tape section including a second patterned data code that is indicative of a second spacing between the tape head and the second tape section, the second patterned data code being different than the first patterned data code; (B) moving the first tape section of the diagnostic tape across the tape head to generate first information; and (C) moving the second tape section of the diagnostic tape across the tape head to generate second information.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Embodiments of the present invention are described herein in the context of a system and method for estimating and/or quantifying tape head-media spacing with a diagnostic tape cartridge including a diagnostic tape that is patterned, e.g., formatted, with predetermined head-media spacings. More specifically, the diagnostic tape cartridge, and the diagnostic tape provided therein, can be effectively utilized to more accurately and precisely assess the health of the tape drive and recognize when cleaning of the tape head is appropriate and necessary. As a result, the tape drives and the magnetic tape library as a whole can better maintain peak performance and longevity. It is further appreciated that in certain applications such diagnostic activities can also automatically be performed by distributed systems in which such a cartridge can be included with the tape library. In such applications, the diagnostic tape can be used to periodically assess the health of tape drives and send messages to appropriate administrative nodes for appropriate remedial action.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar reference indicators will be used throughout the drawings and the following detailed description to refer to the same or like parts.

In the interest of clarity, not all of the routine features of the implementations described herein are shown and described. It will, of course, be appreciated that in the development of any such actual implementations, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 3:
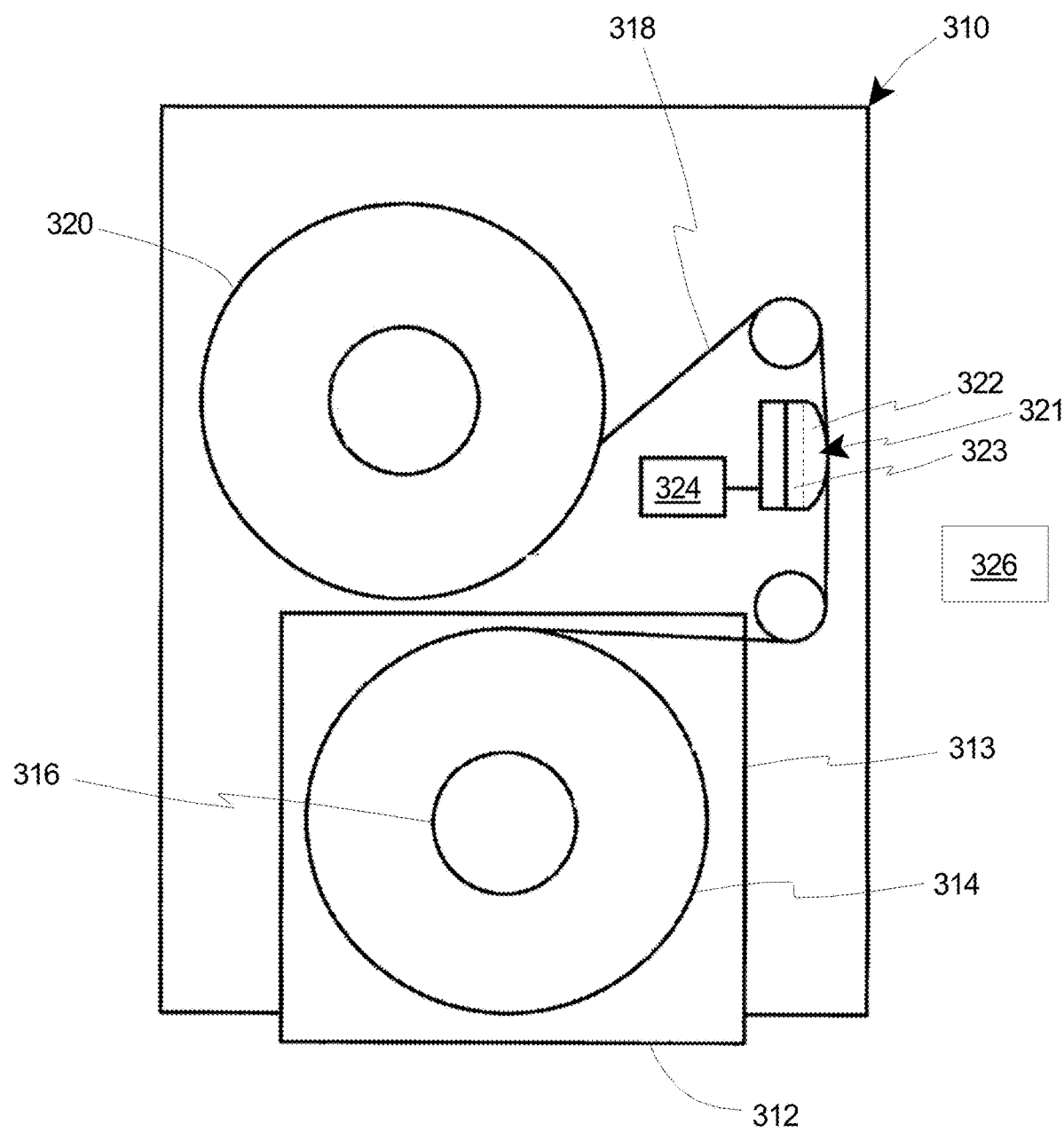
FIG. 3 is a representative embodiment of a tape drive with a tape cartridge having been inserted therein, the tape drive including a tape head, and the tape cartridge including a tape having features of the present invention that is configured to move across the tape head.

FIG. 3 is a representative embodiment of a media drive, in this case a tape drive 310. In the embodiment illustrated in FIG. 3, the tape drive 310 represents a generic tape drive, and is shown by way of example and not by way of limitation. In one embodiment, the tape drive 310 operates in compliance with a linear tape open (LTO) specification, such as LTO-6 or LTO-7. It is appreciated that the subject matter described herein is not limited to use with/within the tape drive 310 specifically illustrated in FIG. 3, but instead is operable with/within a variety of tape drives or other media drives. The tape drive 310 is shown with a tape cartridge 312 inserted into the tape drive 310. The tape cartridge 312 is removable from the tape drive 310, and includes a cartridge housing 313, and a cartridge reel 314 with a cartridge reel hub 316 that are all positioned substantially within the cartridge housing 313. A tape 318 is spooled about the cartridge reel hub 316 of the cartridge reel 314. The tape cartridge 312 supplies the tape 318 to the tape drive 310. The tape drive 310 includes a drive reel 320 which takes up the tape 318 from the tape cartridge 312 (when inserted) and moves the tape 318 across a head stack 321 including a tape head 322 and a servo head 323 (illustrated in phantom). As illustrated, the tape drive 310 also includes a controller 324 that can be communicatively coupled to the tape head 322 and the servo head 323. Additionally and/or alternatively, the tape drive 310 can include more components or fewer components than those specifically illustrated and described herein. Further, in certain embodiments, the tape drive 310 can also be functionally controlled, at least in part, by a controller 326 that is external to the tape drive 310 itself. For example, in some such embodiments, the external controller 326 can be provided generally within a host server system.

In various embodiments, the tape cartridge 312 can be a diagnostic tape cartridge, and the tape 318 can be a diagnostic tape as described in greater detail herein. In such embodiments, as provided herein, the tape 318 in the tape cartridge 312 contains pre-written data, which is patterned, e.g., formatted, with predetermined head-media spacings for purposes of testing the tape head 322 of the tape drive 310. More particularly, as described in greater detail herein below, the pre-written data on the tape 318 is logically divided into multiple sections with different predetermined head-media spacings for each section. Within each section of the tape 318, the formatted data can be used in conjunction with and/or interspersed with unformatted data in a manner to ensure continuing proper operation of the tape drive 310. Thus, with use of the specially patterned tape cartridge 312 within the tape drive 310, the controller 324 and/or the controller 326 is able to interpret the data from each section of the tape 318 moving across the tape head 322 to accurately estimate the actual spacing that exists between the tape 318 and the tape head 322. For example, after the tape drive 310 reads the diagnostic tape 318 within the diagnostic tape cartridge 312 and captures performance log data (e.g., error rate or some other matrix), the controller 324, 326 can utilize the variation of that parameter from section to section within the diagnostic tape 318 to translate to a quantity of spacing loss, e.g., in comparison to comparable data gathered from testing of a known good tape drive. Stated in another manner, the controller 324, 326 includes one or more processors and circuits that apply at least one specially designed algorithm that utilizes the data from each section of the tape 318 moving across the tape head 322 to accurately estimate the actual spacing that exists between the tape 318 and the tape head 322. Accordingly, the diagnostic tape cartridge 312 and the diagnostic tape 318 can be utilized to accurately estimate and/or quantify the actual spacing between the tape 318 and the tape head 322 such that cleaning processes for the tape head 322 can be scheduled appropriately to avoid both excessive separation (as noted above, also sometimes referred to herein equivalently and alternatively as "spacing loss" or "increased spacing") between the tape head 322 and the tape 318, and pole tip recession.

It is appreciated that the tape drive 310 can include any suitable number of tape heads 322, i.e. a single tape head 322 or multiple tape heads 322, that can be evaluated individually or collectively through use of the system and method described in detail herein. Additionally, it is further appreciated that the diagnostic tape 318 can be configured for use with any type of system. For example, as noted above, the diagnostic tape 318 can fulfill its stated purpose within a tape drive 310 that operates in compliance with LTO-6 or LTO-7 specifications. Additionally and/or alternatively, the diagnostic tape 318 can fulfill its stated purpose within another type of tape drive that has any suitable number of tape heads or channels.

Further, it is appreciated that in certain embodiments, the diagnostic tape 318 can also contain intentionally injected errors into servo bands that are moved across the servo head 323 for purposes of testing whether the tape head 322 is properly positioned relative to the diagnostic tape 318 during use of the tape drive 310. This will further allow the tape drive 310 to test whether the servo head 323 is clogged due to contamination.

Figure 4:
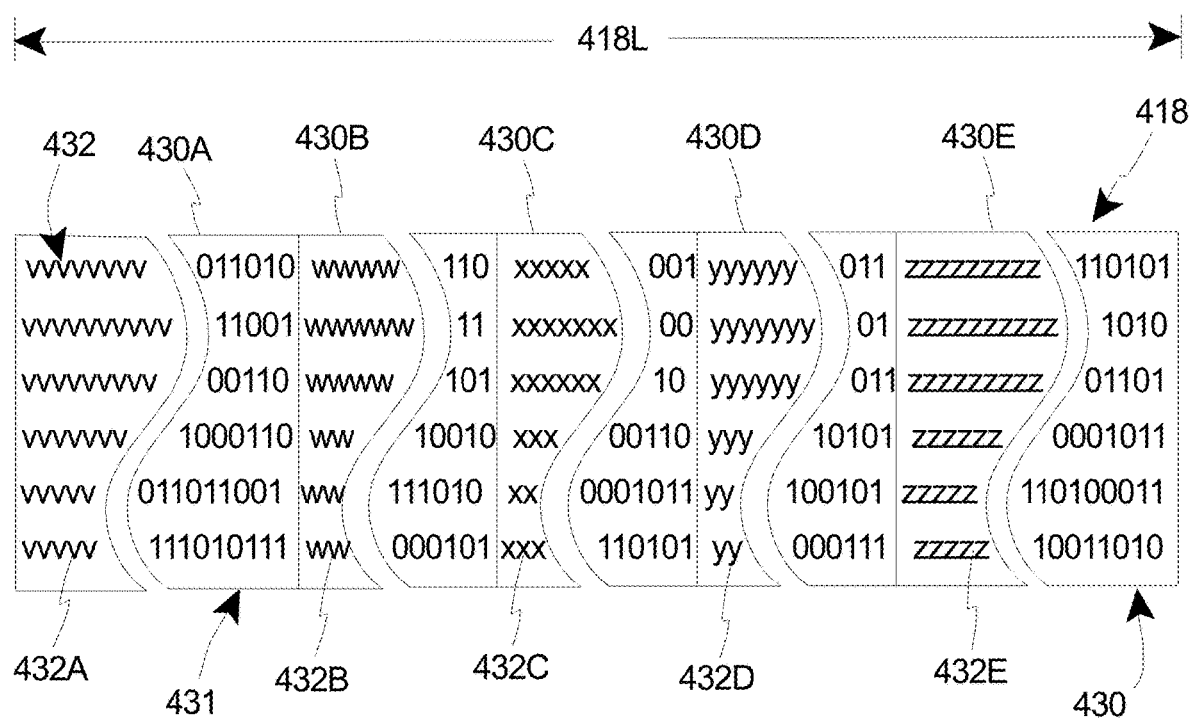
FIG. 4 is a simplified schematic illustration of a portion of an embodiment of a diagnostic tape having features of the present invention.

FIG. 4 is a simplified schematic illustration of a portion of an embodiment of a diagnostic tape 418 having features of the present invention. The design of the diagnostic tape 418 can be varied. As shown in the embodiment illustrated in FIG. 4, in certain embodiments, the diagnostic tape 418 includes a plurality of tape sections 430 (also sometimes referred to herein collectively as a "data block" 431), with each tape section 430 having a different patterned data code 432 that is indicative of a different head-media spacing and/or a different SNR. Additionally, each patterned data code 432 is also indicative of a different operation point along an actual curve for a known good tape drive, i.e. a known good tape head.

As utilized herein, stating that the patterned data code 432 is indicative of a particular head-media spacing and/or a particular SNR is intended to signify that reading of the patterned data code provides information that is directly relative to a particular operation point along the real BER- SNR or BER-spacing loss curve for a known good tape drive with a known good tape head.

The number of tape sections 430 within the data block 431 for the diagnostic tape 418 can be varied. For example, in one non-exclusive alternative embodiment, as shown in FIG. 4, the diagnostic tape 418 can include five tape sections 430 each having a different patterned data code 432 that is indicative of a different head-media spacing and/or a different SNR. In particular, in the embodiment shown in FIG. 4, the data block 431 includes (i) a first tape section 430A having a first patterned data code 432A (illustrated with a series of v's in FIG. 4) that is indicative of a first head-media spacing and/or a first SNR; (ii) a second tape section 430B having a second patterned data code 432B (illustrated with a series of w's in FIG. 4) that is indicative of a second head-media spacing and/or a second SNR; (iii) a third tape section 430C having a third patterned data code 432C (illustrated with a series of x's in FIG. 4) that is indicative of a third head-media spacing and/or a third SNR; (iv) a fourth tape section 430D having a fourth patterned data code 432D (illustrated as a series of y's in FIG. 4) that is indicative of a fourth head-media spacing and/or a fourth SNR; and (v) a fifth tape section 430E having a fifth patterned data code 432E (illustrated as a series of z's in FIG. 4) that is indicative of a fifth head-media spacing and/or a fifth SNR. It is appreciated that each of the patterned data codes 432A, 432B, 432C, 432D, 432E is different than each of the other patterned data codes 432A, 432B, 432C, 432D, 432E. Thus, each patterned data code 432A, 432B, 432C, 432D, 432E is indicative of a different head-media spacing and/or a different SNR. Alternatively, the diagnostic tape 418 and/or the data block 431 can include greater than five or fewer than five tape sections 430.

The design of the patterned data codes 432A-432E can be varied. For example, in certain embodiments, each of the patterned data codes 432A-432E can include specially formatted data (indicated with the v's, w's, x's, y's and z's) that is used in conjunction with and/or interspersed with unformatted data (indicated with a series of 0's and 1's) within each tape section 430A-430E, respectively. In such embodiments, it is appreciated that the specially formatted data is the data that is specifically utilized for purposes of diagnosing the health of the tape drive 310 (illustrated in FIG. 3). Further, it is also appreciated that the unformatted data can take on any form and has no specific requirements, as the unformatted data is merely provided to ensure proper operation of the tape drive 310.

Additionally, in some such embodiments, the formatted data can be arranged to form a predominantly diagonal pattern along a length (i.e. measured from left-to-right in FIG. 4) of the particular tape section 430A-430E. In such embodiments, by using a predominantly diagonal pattern for the formatted data within each tape section 430A-430E, the diagnostic tape 418 can be utilized to individually and independently measure or evaluate the health of the individual tape heads/channels within the tape drive 310. Alternatively, the patterned data codes 432A-432E can have another suitable design and/or the formatted data within each tape section 430A-430E can be arranged in a different manner than what is shown in FIG. 4. For example, in another non-exclusive embodiment, the patterned data codes 432A-432E can be provided by encoding the data with different frequencies that can be indicative of different head-media spacings and/or different operation points.

Further, in one embodiment, the formatted data and/or the different frequencies that are encoded and interspersed within the unformatted data can be arranged in a synchronous format within each tape section 430A-430E. Alternatively, in another embodiment, the formatted data and/or the different frequencies that are encoded and interspersed within the unformatted data can be arranged in an asynchronous format within each tape section 430A-430E.

Additionally, as shown in FIG. 4, the tape sections 430 can be positioned substantially, if not directly, adjacent to one another, i.e. along a length 418L (measured in the direction illustrated with a double-headed arrow in FIG. 4) of the diagnostic tape 418. More specifically, as shown, (i) the first tape section 430A can be positioned substantially or directly adjacent to the second tape section 430B; (ii) the second tape section 430B can be positioned substantially or directly adjacent to the third tape section 430C; (iii) the third tape section 430C can be positioned substantially or directly adjacent to the fourth tape section 430D; and (iv) the fourth tape section 430D can be positioned substantially or directly adjacent to the fifth tape section 430E. Alternatively, in other embodiments, each of the tape sections 430A-430E can be positioned spaced apart from each of the other tape sections 430A-430E.

It is understood that the use of the terms "first", "second", "third", "fourth", and "fifth" for the tape sections, the patterned data codes, the head-media spacings and the SNR is merely for convenience and ease of illustration. Thus, it is further understood that any of the tape sections, the patterned data codes, the head-media spacings and the SNR can be referred to as the "first", "second", "third", "fourth" or "fifth".

When it is desired to use the diagnostic tape 418 for purposes of evaluating a tape drive 310 and the tape head 322 (illustrated in FIG. 3) therein, the tape cartridge 312 (illustrated in FIG. 3) with the diagnostic tape 418 can be inserted into the tape drive 310. Additionally, when the diagnostic tape cartridge 312 and the diagnostic tape 418 are inserted into the tape drive 310, the diagnostic tape 418 and all the tape sections 430 included as part of the diagnostic tape 418, are configured to move across the tape head 322. The tape head 322 can then read the patterned data codes 432 from each tape section 430. More specifically, during use of the diagnostic tape 418 within the tape drive 310, the tape head 322 can (i) read the first patterned data code 432A from the first tape section 430A to generate first information relevant to the true head-tape spacing between the tape head 322 and the tape 418, (ii) read the second patterned data code 432B from the second tape section 430B to generate second information relevant to the true head-tape spacing between the tape head 322 and the tape 418, (iii) read the third patterned data code 432C from the third tape section 430C to generate third information relevant to the true head-tape spacing between the tape head 322 and the tape 418, (iv) read the fourth patterned data code 432D from the fourth tape section 430D to generate fourth information relevant to the true head-tape spacing between the tape head 322 and the tape 418, and (v) read the fifth patterned data code 432E from the fifth tape section 430E to generate fifth information relevant to the true head-tape spacing between the tape head 322 and the tape 418. Subsequently, the controller 324, 326 (illustrated in FIG. 3) can use one or more of the first information, the second information, the third information, the fourth information, and the fifth information to accurately estimate the true head-tape spacing between the tape head 322 and the tape 418.

Additionally, or in the alternative, in some embodiments, as noted above, it is appreciated that it may be desired to further test and/or evaluate the servo head 323 (illustrated in FIG. 3) to determine whether or not the servo head(s) are clogged due to contamination. For example, in one such non-exclusive alternative embodiment, the first patterned data code 432A of the first tape section 430A may be specifically configured, e.g., injected with intentional defect-type errors, to test and/or evaluate the servo head(s) 323. In such embodiment, it may be preferred to test the servo head(s) 323 first, i.e. before testing the readers and/or writers of the tape head(s) 322, as it may be needed to have good servo head(s) 323 in order to properly test the tape head(s) 322. In another non-exclusive alternative embodiment, the fifth (or last) patterned data code 432E of the fifth (or last) tape section 430E can be so configured to test and/or evaluate the servo head(s) 323. In still another such embodiment, the tape 418 can include such sections configured for purposes of testing the servo head(s) 323 at the beginning and at the end of the tape 418, and where in between such sections the tape 418 includes the diagnostic sections for testing the tape head(s) 322 are described in detail herein.

Figure 5A:
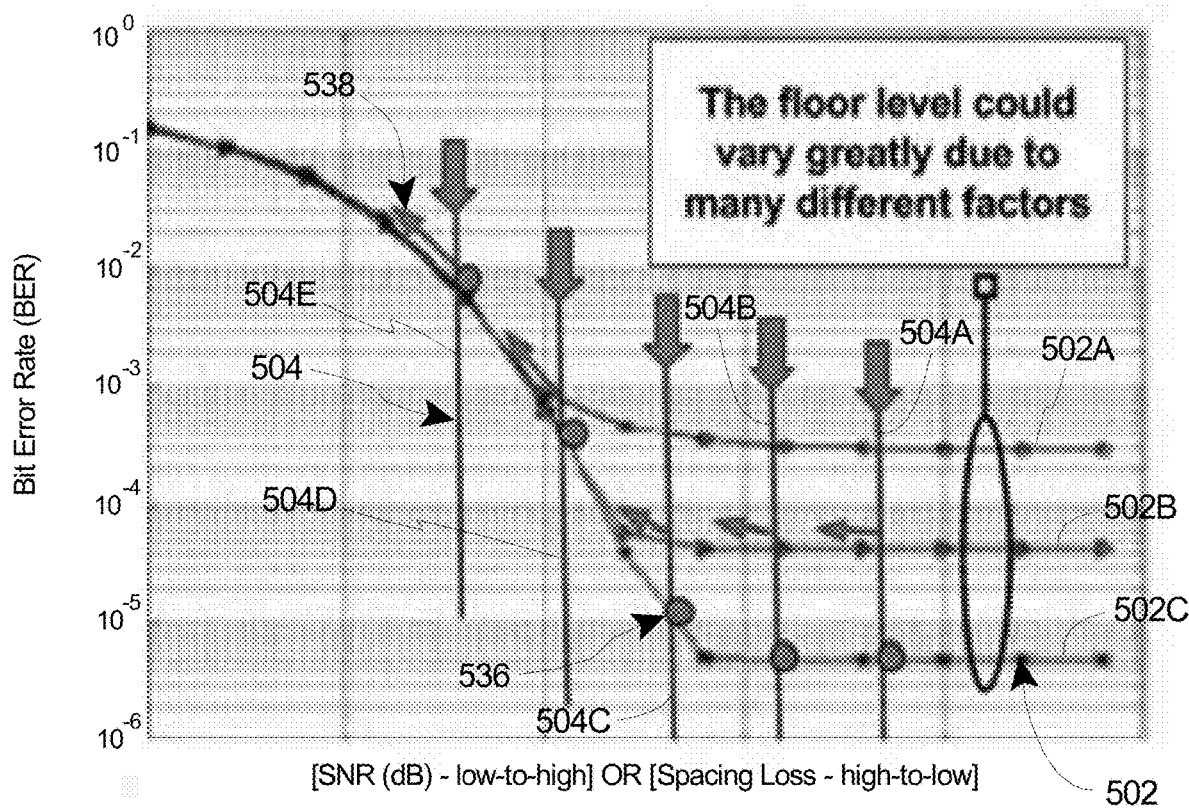
FIG. 5A is a graphical illustration of a representative relationship between bit error rate and signal-to-noise ratio, or between bit error rate and spacing loss, for a tape drive using the diagnostic tape illustrated in FIG. 4.

FIG. 5A is a graphical illustration of a relationship between bit error rate and signal-to-noise ratio, or between bit error rate and spacing loss, for a tape drive, e.g., the tape drive 310 shown in FIG. 3, using the diagnostic tape 418 illustrated in FIG. 4. More specifically, FIG. 5A illustrates a series of curves 502 that have been generated for a known good tape drive (i.e. with known good tape head(s)), with bit error rate (BER) again represented along the Y-axis, and the signal-to-noise ratio (SNR) or spacing loss (or excessive separation) again represented along the X-axis. As above, the value of the spacing loss decreases (going from high-to-low) with movement from left-to-right in the graph.

Additionally, the relationship between BER and SNR (or spacing loss) in the known good tape drive reaches a floor level for BER as the SNR increases or the spacing loss decreases to a certain point. Further, as noted in FIG. 5A, the floor of the curves 502 can vary greatly due to many factors, e.g., drive type, media type, environmental conditions such as temperature and humidity, error correction coding (ECC) power, detection technique used, cycle-slip detection capabilities, general technical requirements, etc., that are seen within the environment in which the tape drive is operating as well as within the tape drive itself. Thus, FIG. 5A again actually shows three curves for the known good tape drive, i.e. a first curve 502A, a second curve 502B, and a third curve 502C, which each have a different floor value for how low the BER actually goes.

Large dots 536 are provided in FIG. 5A to indicate a baseline measurement for the known good tape drive, i.e. along the third curve 502C which has the lowest floor value for BER. Further, a plurality of operation points 504A, 504B, 504C, 504D, 504E (illustrated as vertical lines that cross each of the curves 502A, 502B, 502C) are also provided in FIG. 5A. It is appreciated that the illustration of the curves 502A, 502B, 502C and the operation points 504A, 504B, 504C, 504D, 504E is somewhat similar to what was illustrated and described above in relation to FIG. 2.

Each of the plurality of operation points 504A, 504B, 504C, 504D, 504E equates to one of the tape sections 430 (illustrated in FIG. 4), patterned data codes 432 (illustrated in FIG. 4) and head-media spacing (or SNR). In particular, (i) a first operation point 504A equates to the first tape section 430A (illustrated in FIG. 4), the first patterned data code 432A (illustrated in FIG. 4), and the first head-media spacing and/or first SNR; (ii) a second operation point 504B equates to the second tape section 430B (illustrated in FIG. 4), the second patterned data code 432B (illustrated in FIG. 4), and the second head-media spacing and/or second SNR; (iii) a third operation point 504C equates to the third tape section 430C (illustrated in FIG. 4), the third patterned data code 432C (illustrated in FIG. 4), and the third head-media spacing and/or third SNR; (iv) a fourth operation point 504D equates to the fourth tape section 430D (illustrated in FIG. 4), the fourth patterned data code 432D (illustrated in FIG. 4), and the fourth head-media spacing and/or fourth SNR; and (v) a fifth operation point 504E equates to the fifth tape section 430E (illustrated in FIG. 4), the fifth patterned data code (illustrated in FIG. 4), and the fifth head-media spacing and/or fifth SNR. It is also noted that each of the operation points 504A, 504B, 504C, 504D, 504E contacts or coincides with one of the large dots 536 provided along the third curve 502C. As such, the operation points 504A, 504B, 504C, 504D, 504E and the large dots 536 demonstrate actual measurements that would be expected during testing of an unknown quality tape drive (i.e. with unknown quality tape head(s)) if the unknown quality tape drive was a good tape drive with no excessive separation between the tape head and the tape.

Further provided in FIG. 5A is a plurality of arrows 538, with the tail of each arrow 538 contacting one of the vertical lines that indicate the various operation points 504A, 504B, 504C, 504D, 504E. More specifically, the tail of a first arrow 538 contacts the vertical line that indicates the first operation point 504A, the tail of a second arrow 538 contacts the vertical line that indicates the second operation point 504B, the tail of a third arrow 538 contacts the vertical line that indicates the third operation point 504C, the tail of a fourth arrow 538 contacts the vertical line that indicates the fourth operation point 504D, and the tail of a fifth arrow 538 contacts the vertical line that indicates the fifth operation point 504E. Thus, the tails of the arrows 538 equate to the supposed measurements of the unknown tape drive if there is no excessive separation between the tape head and the tape. Additionally, the head of each of the arrows 538 can be used to indicate an actual measurement of the unknown tape drive having a certain amount of excessive separation (or spacing loss) between the tape head and the tape.

With the actual measurements that may be provided for the unknown tape drive, i.e. through use of the diagnostic tape 418 within the tape drive 310, the controller 324, 326 (illustrated in FIG. 3) can utilize a specially designed algorithm to accurately estimate the equivalent spacing loss for the unknown tape drive with all of the collected information and data for the unknown tape drive in comparison to the data collected for the known good tape drive. With such information for the estimated equivalent spacing loss, the controller 324, 326 can further indicate to an operator when it would be timely and appropriate to perform a cleaning operation on the unknown tape drive so as to clean the tape head(s) of the unknown tape drive.

In certain embodiments, it is desired to reserve a known good tape drive within the tape library at all times. With such design, necessary comparative information can be obtained and/or is readily accessible at any time for effectively evaluating an unknown tape drive with the diagnostic tape 418.

Figure 1:
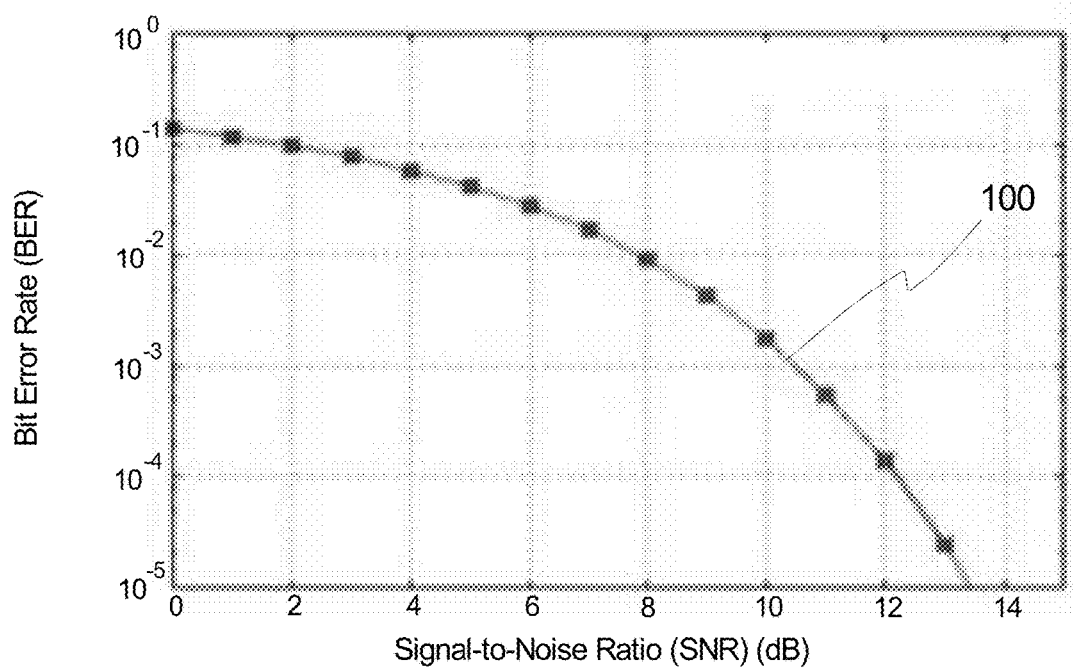
FIG. 1 is a graphical illustration of a theoretical relationship between bit error rate and signal-to-noise ratio for a theoretical prior art tape drive.
Figure 2:
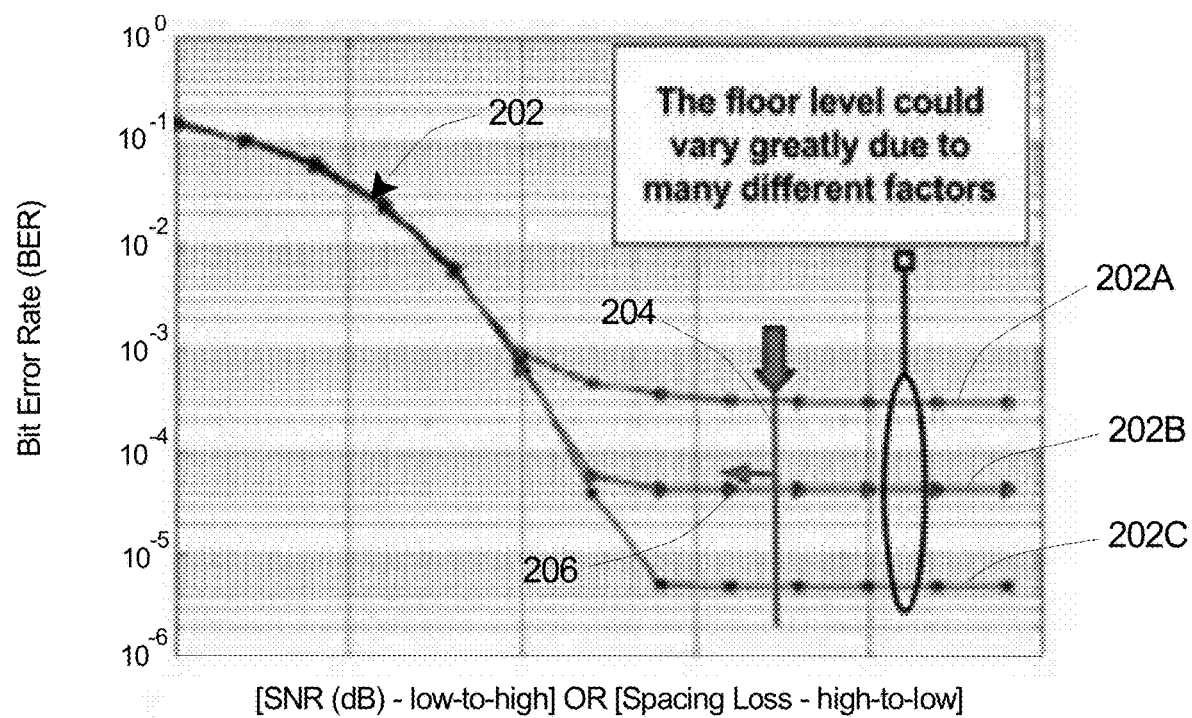
FIG. 2 is a graphical illustration of a representative relationship between bit error rate and signal-to-noise ratio, or between bit error rate and spacing loss, for an actual prior art tape drive.

As provided herein, the curves 502A, 502B, 502C as illustrated in FIG. 5A can be effectively utilized to estimate the relationship between BER and SNR and/or the spacing between the tape and the tape head of an unknown tape drive. In certain applications, the curves 502A, 502B, 502C (see also the curves as shown in FIGS. 1 and 2) that are drawn based on testing of a known tape drive can be provided based on an uncoded testing of a tape drive. Stated in another manner, the drawings of the curves 502A, 502B, 502C can occur based on data collection prior to any error correction being applied, e.g., prior to error correction coding (ECC).

Returning back to FIG. 4, as noted above, the diagnostic tape 418 includes the plurality of tape sections 430 having different patterned data codes 432 that are indicative of different head-media spacing and/or different SNR. In various applications, the ability to format the diagnostic tape to have such tape sections 430 can be accomplished through the relationship described by the magnetic recording theory Wallace equation:

$$\text{signal} \cong C \cdot e^{-k(d+a)} \cdot \frac{1-e^{-k\delta}}{k} \quad \text{(Equation 2)}$$

where C is a constant factor, $k=2\pi/\lambda$, $\lambda$ is the recording wavelength, d is the magnetic head tape spacing, a is the transition parameter, and $\delta$ is the medium thickness. It is understood that the signal level can be modified to the desired level by adjusting the d, a, and $\delta$ during the write process.

In certain applications, error correction can be provided in the form of internal ECC as a means to improve the estimation performance of the present system, i.e. to improve the estimation of the magnetic head tape spacing ("d"). For example, as can be seen in Equation (1), the Wallace equation can be used to approximate a direct relationship between the SNR and the head/media spacing. To be able to use this formulation, as provided herein, the present invention provides a BER-SNR transformation methodology by writing different portions of tape with different signal quality that are subsequently read back by the tape drive. It is appreciated that with the system and method described in detail herein, since the purpose is to identify and analyze the BER-SNR curve and not to detect or read original user data, the tape drive should still be able to operate at maximum speed even with C2 decoding failures.

The described method enables different operating points to be achieved so as to establish a better functional relationship between BER and SNR. It is noted that BER, as referred to herein, refers to the detector output bit error rate. This BER is assumed to be directly measurable. However, it is further appreciated that there might be additional locations in a concatenated read channel system where the error performance can be measured. For example, in one embodiment, the C1 output symbol error rate can be measured. Through independence assumptions and binomial distribution, the C1 input symbol and hence the BER can then be calculated. Thus, the detector output BER can alternatively be calculated by back tracking the C1 correction performance. Due to heavy interleaving and randomization, it is conceivable that this alternative manner may more accurately estimate the BER performance. It is appreciated that estimation of the operational BER is important because it has a direct impact on the SNR estimation and hence the separation distance estimation.

Alternatively, external ECC can also be utilized to improve the estimation performance of the present system. Based on the slope of the curves 502A, 502B, 502C, i.e. at any given operation point 504A, 504B, 504C, 504D, 504E, the effect of the BER estimation error is different on the estimation error of the signal quality or power or SNR. For example, an error in BER in the steep or waterfall region of the curves 502A, 502B, 502C only slightly changes the estimated SNR due to the steeper slope as compared to the floor region of the curves 502A, 502B, 502C. Therefore, in order to reduce or minimize the SNR estimation error, the data can first be encoded externally and written to tape according to the desired format. In some embodiments, while reading the data from the tape, an extra decoding stage may be utilized that takes the detector output and decodes the data to obtain the corresponding BER. Based on the decoded BER and the SNR-BER curve (e.g., a new curve with ECC), the SNR and hence the spacing can be estimated more accurately. An illustrative example is given below comparing the uncoded and coded cases separately.

Figure 5B:
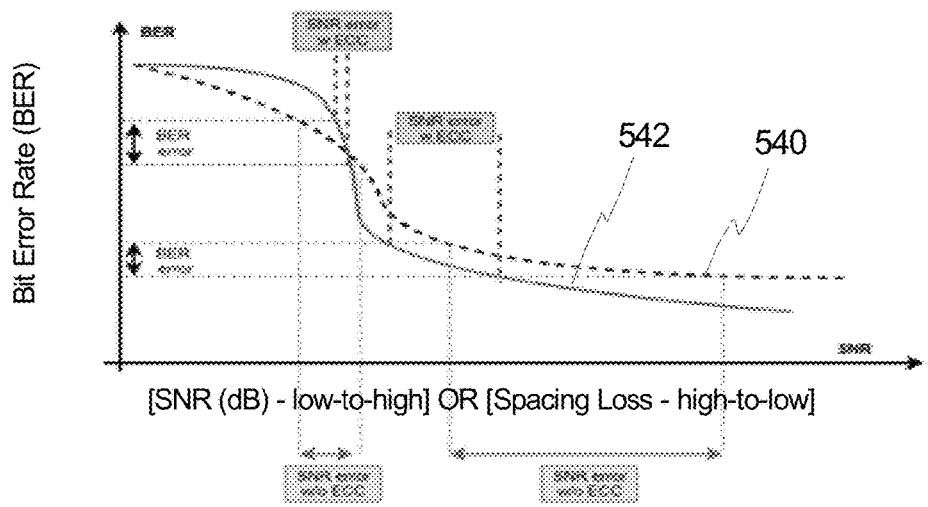
FIG. 5B is a graphical illustration of a pair of curves that illustrate a representative relationship between bit error rate and signal-to-noise ratio in both an uncoded format and a coded format.

FIG. 5B is a graphical illustration of a pair of curves that illustrate the SNR-BER relationship in both an uncoded format and a coded format. More particularly, FIG. 5B illustrates a first curve 540 (illustrated with a dashed line) that illustrates the SNR-BER relationship in an uncoded format, and a second curve 542 (illustrated with a solid line) that illustrates the SNR-BER relationship in a coded format. As can be clearly seen in FIG. 5B, the calculated SNR error is less on the second curve 542 (i.e. the coded curve) in comparison to the first curve 540 (i.e. the uncoded curve) regardless of where you are along the curve, e.g., in the steep region of the curve and/or in or near the floor region of the curve. As such, the second curve 542 or coded curve can provide a better, more accurate estimation of the SNR or head tape spacing than the first curve 540 or uncoded curve. Additionally, as shown, in certain applications, the second curve 542 or coded curve can enable a slightly lower floor as compared to the first curve 540 or uncoded curve.

It is understood that the coded format provides improved estimation of the SNR or head tape spacing provided the ECC exhibits an appropriate error floor, even with a sharp waterfall region. It is further noted that this is advantageous since the error floor is defined due to system operation and burst correlated errors, as long as error floor of the code is below the error floor of the system.

Returning again to FIG. 4, it is appreciated that the desired patterning or formatting of the diagnostic tape 418, i.e. the desired patterning or formatting of certain data within each tape section 430A-430E of the diagnostic tape 418, can be performed in any suitable manner. More specifically, there could be multiple methods of writing the patterned data codes 432A-432E to each tape section 430A-430E of the diagnostic tape 418 and any suitable and available equipment can be utilized to perform such methods. It is appreciated that during the patterning of each of the tape sections 430A-430E of the diagnostic tape 418, errors are intentionally being included within the patterned data codes 432A-432E. These errors, as provided herein, are configured to be specifically indicative of particular head-media spacings and/or particular SNR operation points along the appropriate curve. Stated in another manner, in certain embodiments, each of the tape sections 430A-430E is configured to include a different patterned data code 432A-432E that includes intentionally provided errors in the form of specially formatted data or specially encoded frequencies that are interspersed with unformatted data. It is appreciated, however, as provided herein, that the injected errors must not exceed a certain correction limit, or the overall system may fail and thus not enable proper testing of the tape drive 310 and/or tape heads 322.

In a first method, entire data can initially be written as necessary along the full length 418L of the diagnostic tape 418 with normal optimized write current. Subsequently, AC-erase can be performed, as necessary, partially over each tape section 430. More specifically, after the original data is written along the length 418L of the diagnostic tape 418, another system, such as the tape drive 310 with special firmware or hardware installed therein, can be used to AC-erase portions of each tape section 430A-430E of the diagnostic tape 418 based on the longitudinal tape position which can be measured using servo heads and local processor operating system (LPOS) feedback. The AC-erased sections can be controlled and the amount of AC-erasure current can be programmed based on the desired patterning or formatting of each tape section 430A-430E. This method will thus lower the SNR for the data signals sensed by the reader. Although the adaptive data channel equalizer will try to compensate for the lower SNR, the effect seen by a Viterbi section (or Data-Dependent Noise Predictive Maximum Likelihood Detector logic (DD-NPMLD) or List Noise Predictive Maximum Likelihood Detector logic (List-NPMLD)) will be a lower SNR as AC current strength is varied based on the specific tape sections 430A-430E of the diagnostic tape 418. This lower SNR seen by the Viterbi or other suitable detector will generate more errors and change the operation point of the system as defined by the departure curve. Stated in another manner, the level of partial erase for each tape section 430A-430E is controlled by the write current, and should be calibrated to achieve the desirable SNR/spacing for each tape section 430A-430E. This approach mainly modifies the d (spacing) to achieve the desired SNR for each tape section 430A-430E.

In a second method, different writers and/or different drive operation settings can be utilized. In such method, the write process has different effectiveness (different a), and thus different read back signal level. More particularly, in this method, write errors by the tape drive 310 can be achieved using a tape drive 310 with a modified firmware. In this method, the tape drive 310 will write the original data to the diagnostic tape 418 per a usual method. After writing, the tape drive 310 using the modified firmware would read the data, and while reading the data would actually write new data patterns for controlled errors to the existing tracks which contain the actual old data. This would be done for each tape section 430A-430E of the diagnostic tape 418 again based on LPOS information sensed by the servo heads. The error patterns could be written in any suitable form to generate a variety of error conditions from single bits to a burst of bits such that a Viterbi or other suitable detector will be forced to operate at different points on the departure curve. Thus, this is a way of injecting errors using a tape drive with a modified firmware. It is noted that since many modern tape drives use DD-NPMLD, the injected errors might also include data-dependent noise, so the new detectors are forced to work with these types of errors. It is possible to use this method if a user has a different version of the writer (e.g., coated and uncoated head) and register level drive control (write current, overshoot, tension, etc.).

Alternatively, in a third method, the data can again be written to the diagnostic tape 418 in a usual manner with a standard tape drive, and then a different tape drive with modified hardware or test equipment can be used to physically inject errors as a burst of errors on the written tracks which contain the old data. Thus, this method provides another way of actually inducing defects onto the diagnostic tape 418.

Still alternatively, in a fourth method, simultaneous data and controlled error patterns are written to the tape with the writing drive using a special firmware where error detection and rewrite mechanisms are disabled so that data with controlled error patterns can be written in one pass as part of the actual tape data format. More particularly, the special firmware can use the internal ECC C2 decoding capability to intentionally inject errors at the specific locations of codewords within the diagnostic tape. It is appreciated that error pattern location can be part of individual channel codeword format, which is defined by C1 ECC, where the error patterns can simulate random error conditions which have a direct correlation to the SNR and Viterbi data detector logic such as shown in FIGS. 5A and 5B. Thus, the idea is to embed errors such that the C1 ECC will see random errors at its input. In particular, by injecting errors at specific locations in the tape format, controlled random errors can be generated that will force C1 ECC to function accordingly. Additionally, the errors need to be placed such that they can simulate errors at headers, data and ECC section in a random distribution with varying levels so FIGS. 5A and 5B can be used to evaluate the actual tape-head spacing at each channel.

As provided herein, the method of injecting errors into the diagnostic tape can be effective in generating the desired diagnostic tape provided that the level of C2 decoding failures does not exceed a threshold level, i.e. a correction limit. Thus, for a given data format description (such as LTO7 or LTO8), with C1 and C2 code parameters, the maximum number of symbol errors that can be tolerated by all C2 decodings of a given data set must first be determined. It is appreciated that the possibility of decoding failure is not only a function of the number of errors, but also their distribution over the tape layout, since subdata sets constitute codewords that are interleaved and spread across tape. C2 failure can be defined as any one of the tape ECC patterned data sections having C2 input errors such that C2 ECC cannot correct such errors using its erasure mode correction capability. It is understood that the system allows C1 failures which are fed to C2 ECC input after interleaving, but the size of the injected errors must be calculated based on the C2 ECC format interleave characteristics. Thus, it is appreciated that during manufacturing of the diagnostic tape, injected C2 errors should be limited so as to not exceed the correction limit. Additionally, regardless of the error injection method, the injected errors cannot be clustered, correlated or burst such that these will result in C2 failure during read mode as the tape head is being tested with the diagnostic tape. Further, in one embodiment, as a means to ensure that a maximum number of tolerable errors is not exceeded for a given format and C2 code, the error patterns can be configured and injected that specifically allow for the maximum number of tolerable errors less some margin for random errors that may appear during normal operation of the tape drive. Thus, error injections can be configured to be under control at all times, such that they do not lead to undesired system behavior such as C2 decoding failures/unable to read off data accurately.

Yet alternatively, the writing of the desired patterned data codes 432A-432E to the diagnostic tape 418, i.e. to each tape section 430A-430E of the diagnostic tape 418, can be performed in another suitable manner.

Additionally, or in the alternative, as noted above, one or more of the patterned data codes 432A of the diagnostic tape 418 can include means for testing the servo head 323. For example, similar defect-type errors can be injected into servo bands of the diagnostic tape 418, with small sections of the servo bands being intentionally erased with writers. More particularly, an actuator can be moved up and down at a periodic rate with writers enabled with a certain data pattern to erase portions of the servo bands in a controlled manner. Thus, specially configured error patterns can easily be generated by controlled write operations with the head being moved up and down in an open loop over a wide enough range to make sure the writers are over a predetermined servo band so that programmed servo defects with pre-defined patterns are generated by the drive writers. In such embodiments, if the tape drive 310 has pre-knowledge of where on the diagnostic tape 418 there are controlled erasure sections for purposes of testing the servo head 323, the controller 324, 326 can use such sections to test whether or not the servo head 323 is good, i.e. whether the servo head 323 needs to be cleaned.

Figure 6A:
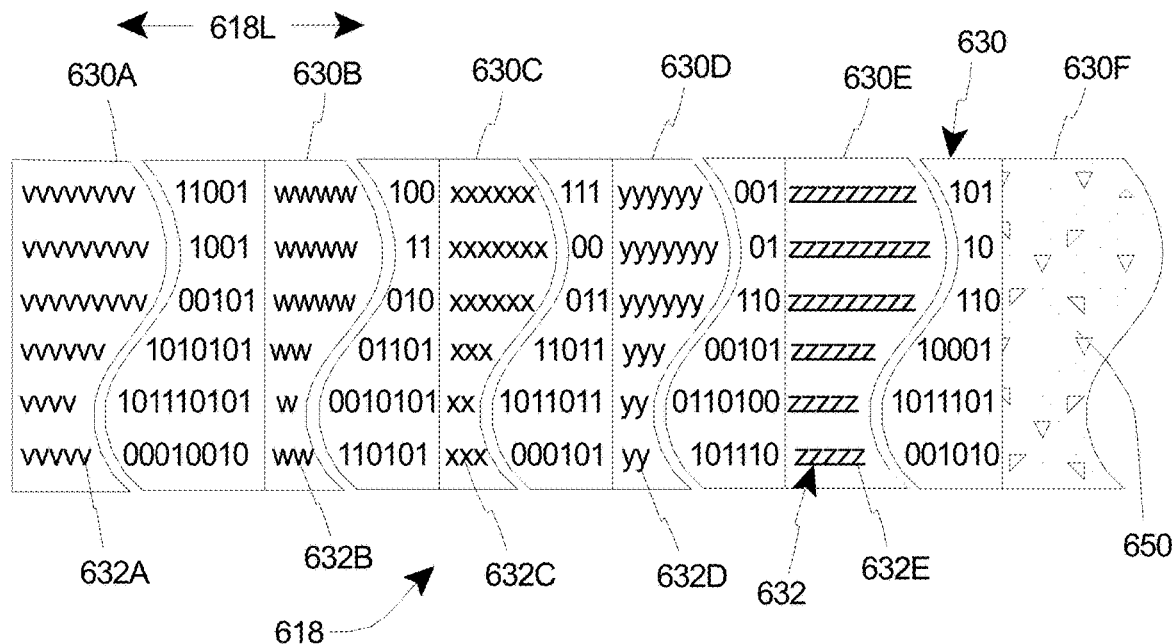
FIG. 6A is a simplified schematic illustration of a portion of another embodiment of the diagnostic tape.

FIG. 6A is a simplified schematic illustration of a portion of another embodiment of the diagnostic tape 618. As illustrated, the diagnostic tape 618 in this embodiment is somewhat similar to the diagnostic tape 418 illustrated and described in relation to FIG. 4. For example, the diagnostic tape 618 again includes a plurality of tape sections 630, with each tape section 630 having a different patterned data code 632 that is indicative of a different head-media spacing and/or a different SNR. Additionally, each patterned data code 632 is again also indicative of a different operation point along an actual curve for a known good tape drive, i.e. a known good tape head. More particularly, as shown in FIG. 6A, the diagnostic tape 618 can again include (i) a first tape section 630A having a first patterned data code 632A (illustrated with a series of v's in FIG. 6A interspersed with a series of 0's and 1's) that is indicative of a first head-media spacing and/or a first SNR; (ii) a second tape section 630B having a second patterned data code 632B (illustrated with a series of w's in FIG. 6A interspersed with a series of 0's and 1's) that is indicative of a second head-media spacing and/or a second SNR; (iii) a third tape section 630C having a third patterned data code 632C (illustrated with a series of x's in FIG. 6A interspersed with a series of 0's and 1's) that is indicative of a third head-media spacing and/or a third SNR; (iv) a fourth tape section 630D having a fourth patterned data code 632D (illustrated as a series of y's in FIG. 6A interspersed with a series of 0's and 1's) that is indicative of a fourth head-media spacing and/or a fourth SNR; and (v) a fifth tape section 630E having a fifth patterned data code 632E (illustrated as a series of z's in FIG. 6A interspersed with a series of 0's and 1's) that is indicative of a fifth head-media spacing and/or a fifth SNR. It is appreciated that each of the patterned data codes 632A, 632B, 632C, 632D, 632E is different than each of the other patterned data codes 632A, 632B, 632C, 632D, 632E. Thus, each patterned data code 632A, 632B, 632C, 632D, 632E is indicative of a different head-media spacing and/or a different SNR. It is further appreciated that in certain embodiments, the plurality of tape sections 630A-630E that each include a different patterned data code can be referred to collectively as a "data block".

However, in the embodiment illustrated in FIG. 6A, the diagnostic tape 618 further includes a sixth tape section 630F that can be utilized for purposes of cleaning the tape drive 310 (illustrated in FIG. 3) and/or the tape head(s) 322 (illustrated in FIG. 3) when and if necessary. More specifically, the sixth section 630F can be a tape head cleaning section that can be of any suitable design for purposes of removing the build-up of the layer of dust, debris, etc. that has been created on the tape head 322. For example, in some embodiments, the tape head cleaning section 630F includes abrasive material 650 formed along the surface of the diagnostic tape 618. With such design, when desired, the sixth section 630F, i.e. the tape head cleaning section, can be moved across the tape head(s) 322 of the tape drive 310 to effectively scrape away the build-up of the layer of dust, debris, etc. that has been created on the tape head 322 such that the excessive separation between the tape head 322 and the tape 618 is reduced.

As provided herein, it is appreciated that the tape head cleaning section 630F of any suitable design can be used for purposes of cleaning the servo head 323 (illustrated in FIG. 3) in addition to be used for cleaning the tape head 322.

Alternatively, in another embodiment, the tape head cleaning section 630F can be based on a special diamond-like abrasive media. For example, in situations where the tape head 322 may suffer from lubrication or stearic acid-type contamination, the tape head 322 may require abrasivity that is more controlled such that it can clean stearic acid contamination without causing damage to the tape head 322. The special diamond-like abrasive material can be more effective in such situations. In one embodiment, the tape head cleaning section 630F that utilizes the special diamond-like abrasive material can be the last section of the diagnostic tape 618 so that it is one of the last cleaning actions to be conducted for the tape drive 310.

Additionally, a special diamond-like abrasive material for the tape head cleaning section 630F can also be employed where the tape head 322 is clean, but may suffer from excessive pole tip recession due to long-term usage. In such situations, polishing the tape head 322 with a special diamond-like abrasive material, where the abrasivity is optimized for head counter and pole tip materials, can result in recovery by reducing the pole tip recession. In one embodiment, the tape head cleaning section 630F that is specifically designed with a special diamond-like abrasive material for reducing pole tip recession can be the last section of the diagnostic tape 618 since this can typically be a cleaning action of last resort.

Still alternatively, in still another embodiment, the tape head cleaning section 630F can include and/or incorporate wavy lapping tape for purposes of cleaning the tape head 322.

Further, as illustrated, the tape head cleaning section 630F can be positioned substantially or directly adjacent to one of the tape sections 630A-630E in the data block, i.e. along a length 618L (measured in the direction illustrated with a double-headed arrow in FIG. 6A) of the diagnostic tape 618. Additionally, in such embodiment, the tape head cleaning section 630F can be positioned at or near the end of the diagnostic tape 618, i.e. after all of the tape sections 630A-630E in the data block. With such design, the operator can effectively evaluate whether or not the tape drive 310 and/or tape heads 322 need to be cleaned before, possibly unnecessarily, exposing the tape heads 322 to the abrasive material 650 included within the tape head cleaning section 630F. Alternatively, the tape head cleaning section 630F can be positioned spaced apart from each of the tape sections 630A-630E in the data block.

Additionally, it is further understood that upon completion of use of the sixth section 630F, i.e. the tape head cleaning section, the diagnostic tape 618 (or another similar diagnostic tape 418 such as shown in FIG. 4) can be re-inserted into the tape drive 310 to once again check the condition of the tape drive 310 (the tape head 322 and/or the servo head 323) for any undesired excessive separation between the tape head 322 (or servo head 323) and the tape 618. This reuse of the diagnostic tape 618 will also serve to evaluate the effectiveness of the cleaning procedure performed with the tape head cleaning section 630F.

Figure 6B:
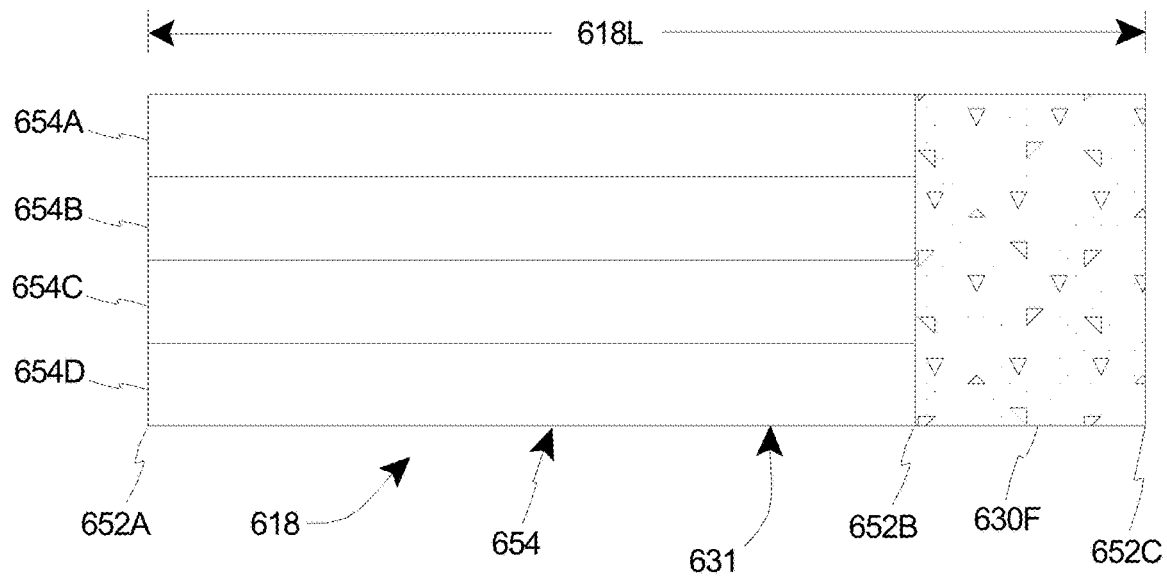
FIG. 6B is a simplified schematic illustration of an embodiment of the general layout of the diagnostic tape illustrated in FIG. 6A.

FIG. 6B is a simplified schematic illustration on an embodiment of the general layout of the diagnostic tape 618 illustrated in FIG. 6A. In particular, in the embodiment shown in FIG. 6B, all of the tape sections that include the patterned data codes, i.e. the data block 631, are illustrated together in one portion of the diagnostic tape 618, prior to the tape head cleaning section 630F along the length 618L of the diagnostic tape 618. Stated in another manner, the data block 631 extends from a beginning of the tape 652A (also the beginning of the data) to an end of the data 652B; and the tape head cleaning section 630F extends from the end of the data 652B to the end of the tape 652C.

The tape head cleaning section 630F can be coupled and/or attached to the data block 631 in any suitable manner. For example, in one non-exclusive embodiment, tape head cleaning section 630F is spliced to the data block 631 at the end of the data 652B. With this design, as noted above, the diagnostic tape 618 can be used for testing the separation between the tape head 322 (illustrated in FIG. 3) and the diagnostic tape 618 without the tape head cleaning section 630F having to pass across the tape head 322 each time the test is done but only when the actual cleaning is requested. As utilized herein, to "splice" means to physically connect the data block 631 and the tape head cleaning section 630F. Alternatively, the tape head cleaning section 630F can be coupled and/or attached to the data block 631 in another suitable manner.

Additionally, as illustrated, the data block 631 of the diagnostic tape 618 is organized into a plurality of partitions 654. It is noted that a typical tape which utilizes the LTO format includes four data partitions. Thus, in the embodiment shown in FIG. 6B, the data block 631 portion of the diagnostic tape 618 includes four partitions 654, i.e. a first partition 654A, a second partition 654B, a third partition 654C, and a fourth partition 654D. Alternatively, the data block 631 can be organized into a different number of partitions 654, i.e. greater than or less than four partitions 654.

The design of each partition 654A-654D can be varied to suit the requirements of the diagnostic tape 618. In one embodiment, the first partition 654A can be a patterned partition (i.e. including a pre-written test pattern or patterned data code such as illustrated and describe above), the second partition 654B can be a patterned partition (i.e. also including a pre-written test pattern or patterned data code such as illustrated and described above), the third partition 654C can be a testing partition that is usable to test the read/write capabilities of the tape heads 322 and which can be erased, and the fourth partition 654D can be a data log section for recording the history of testing results and which cannot be overwritten. Alternatively, one or more of the partitions 654A-654D can have another suitable design or be configured to serve another suitable function.

Thus, in summary, the data block 631 format on the diagnostic tape 618 includes three types of usage. One section (shown as the first partition 654A and the second partition 654B) is assigned for the patterned tape sections which include the pre-written patterned data codes as described in detail above to test the head performance and the cleaning needs. A second section (shown as the third partition 654C) is used for the tape drive 310 (illustrated in FIG. 3) to write and read its own recording. This is important since the pre-written patterned tape sections as described herein above are able to determine the performance of the readers, but not the writers. Therefore, this read/write section of the third partition 654C can be used after making sure the readers are fine by testing the readers using pre-recorded error patterned data code sections as shown by the first partition 654A and the second partition 654B with followed up cleaning using the abrasive tape head cleaning section of the media. With known good readers, the tape drive 310 can move to the read/write partition, i.e. the third partition 654C, to test its writers which may need a different type of a cleaning process.

Finally, a third section, i.e. the fourth partition 654D, is used for data logging, storing entire history of test results (append, but no overwrite) with drive serial numbers and time of the test and cleaning. This enables the diagnostic tape 618 to be used for diagnostics, evaluation as well as smart cleaning functions. Additionally, the diagnostic tape 618 having the history of drive performance including cleaning and effectiveness of the cleaning, can be used for host and library-level machine learning and Artificial Intelligence algorithms to predict drive health and drive failures since it has the history for the drives in the library. Host-based software algorithms can use the data stored in the fourth partition 654D of the diagnostic tape 618 to get quick and comprehensive test data logs for all drives in the library, which this data can be used by the algorithm as the input data for the AI or machine learning. Further, the data of drive performance in the fourth partition 654D can potentially be used by machine learning type applications to predict drive life.

Figure 7:
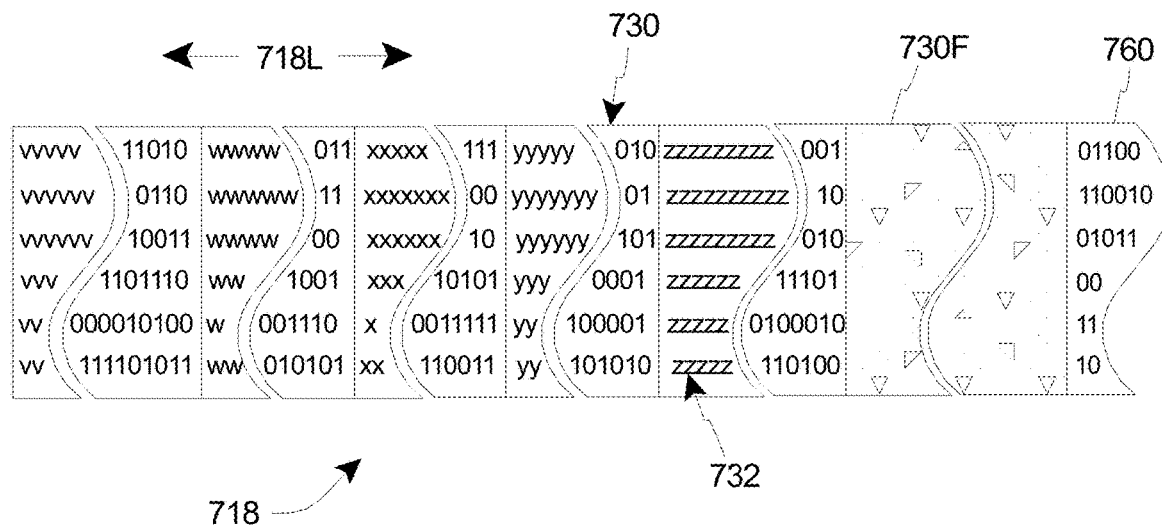
FIG. 7 is a simplified schematic illustration of a portion of still another embodiment of the diagnostic tape.

FIG. 7 is a simplified schematic illustration of a portion of still another embodiment of the diagnostic tape 718. As illustrated, the diagnostic tape 718 in this embodiment is somewhat similar to the diagnostic tape 618 illustrated and described in relation to FIGS. 6A and 6B. For example, the diagnostic tape 718 again includes a plurality of tape sections 730 (i.e. a data block), with each tape section 730 having a different patterned data code 732 that is indicative of a different head-media spacing and/or a different SNR. Additionally, each patterned data code 732 is again also indicative of a different operation point along an actual curve for a known good tape drive, i.e. a known good tape head. Further, the diagnostic tape 718 again also includes a sixth tape section 730F, i.e. a tape head cleaning section, that can be utilized for purposes of cleaning the tape drive 310 (illustrated in FIG. 3) and/or the tape head(s) 322 (illustrated in FIG. 3) when and if necessary so as to improve the spacing for better read/write performance.

However, in this embodiment, the diagnostic tape 718 further includes a data section 760, i.e. a fully unformatted data section, that can be positioned along the diagnostic tape 718 substantially adjacent to the tape head cleaning section 730F, i.e. along a length 718L (measured in the direction illustrated with a double-headed arrow in FIG. 7) of the diagnostic tape 718. The data section 760 can include any type of data such as would be found on any ordinary type of tape or tape cartridge. Such data section 760 can be used for any desired reading of data from and/or writing of data to the diagnostic tape 718.

It is appreciated that in some alternative embodiments of the diagnostic tape 718 illustrated in FIG. 7, the diagnostic tape 718 can be configured to include only the data section 760 and the tape head cleaning section 730F. Stated in another manner, in such embodiments, the diagnostic tape 718 does not include any tape sections with patterned data codes for testing and/or evaluating the tape head 322. In one such embodiment, the tape head cleaning section 730F can include special small abrasive media to clean clogged tape heads 322. This can be considered as a softer cleaning process where the tape drive 310 can us the small abrasive media of the tape head cleaning section 730F to clean the tape head 322 with the media that it is actually using for read and write operations. For example, the tape drive 310, upon detecting issues with read heads can move to the end of the physical diagnostic tape 718 where there is the tape head cleaning section 730F of higher abrasivity where it may address certain types of head clogs that do not require a separate cleaning tape.

It is further appreciated that in certain alternative embodiments of the diagnostic tape 718 illustrated in FIG. 7, the diagnostic tape 718 need not include the tape head cleaning section 730F. In such embodiments, the data section 760 can be positioned along the diagnostic tape 718 substantially adjacent to the plurality of tape sections 730 that make up the data block, i.e. along a length 718L of the diagnostic tape 718. With such design, the diagnostic tape 718 can be quickly utilized to test the read/write performance and functioning of the tape drive 310 and/or the tape heads 322 after the head-media spacing has been analyzed.

Figure 8:
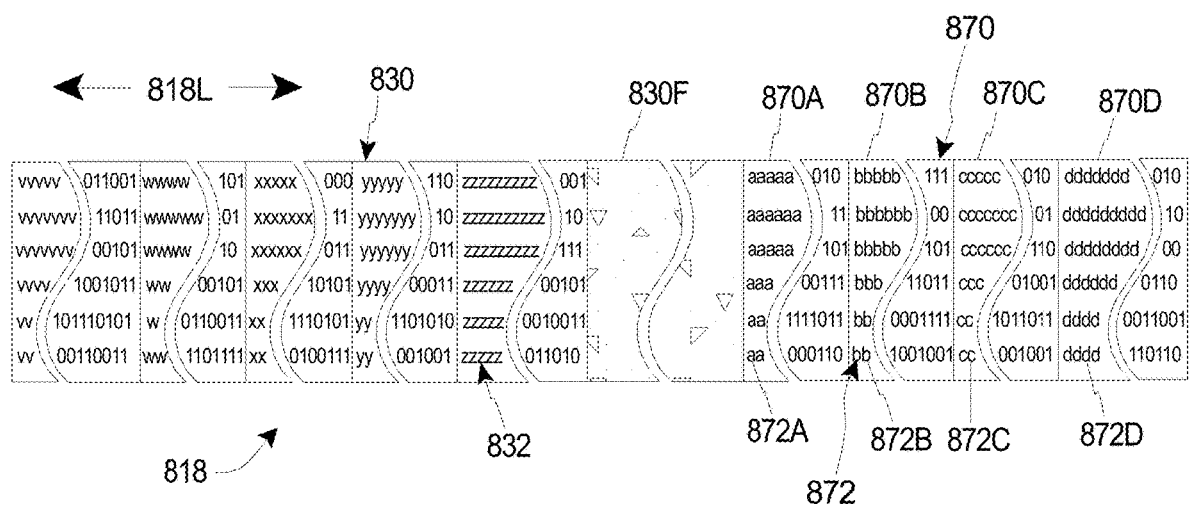
FIG. 8 is a simplified schematic illustration of a portion of yet another embodiment of the diagnostic tape.

FIG. 8 is a simplified schematic illustration of a portion of yet another embodiment of the diagnostic tape 818. As illustrated, the diagnostic tape 818 in this embodiment is somewhat similar to the diagnostic tape 618 illustrated and described in relation to FIGS. 6A and 6B. For example, the diagnostic tape 818 again includes a plurality of tape sections 830 (i.e. a first data block), with each tape section 830 having a different patterned data code 832 that is indicative of a different head-media spacing and/or a different SNR. Additionally, each patterned data code 832 is again also indicative of a different operation point along an actual curve for a known good tape drive, i.e. a known good tape head. Further, the diagnostic tape 818 again also includes a sixth tape section 830F, i.e. a tape head cleaning section, that can be utilized for purposes of cleaning the tape drive 310 (illustrated in FIG. 3) and/or the tape head(s) 322 (illustrated in FIG. 3) when and if necessary so as to improve the spacing for better read/write performance.

However, in this embodiment, the diagnostic tape 818 further includes a second data block 870 that can be utilized for evaluating the effectiveness of the cleaning process without the need to remove and reinsert the diagnostic tape 818 (or subsequently insert another suitable diagnostic tape). The second data block 870, similar to the first data block 830, can include a plurality of second block tape sections 870A-870D, with each second block tape section 870A-870D having a different patterned data code 872A-872D that is indicative of a different head-media spacing and/or a different SNR. More specifically, the second data block 870 can include a first, second block tape section 870A having a first, second block patterned data code 872A (illustrated with a series of a's in FIG. 8 interspersed with a series of 0's and 1's); a second, second block tape section 870B having a second, second block patterned data code 872B (illustrated with a series of b's in FIG. 8 interspersed with a series of 0's and 1's); (iii) a third, second block tape section 870C having a third, second block patterned data code 872C (illustrated with a series of c's in FIG. 8 interspersed with a series of 0's and 1's); and (iv) a fourth, second block tape section 870D having a fourth, second block patterned data code 872D (illustrated as a series of d's in FIG. 8 interspersed with a series of 0's and 1's). Additionally, each patterned data code 872A-872D can also be indicative of a different operation point along an actual curve for a known good tape drive, i.e. a known good tape head.

It is appreciated that the second data block 870 can include any suitable number of second block tape sections 870A-870D. It is further appreciated that in alternative embodiments, the second block tape sections 870A-870D can correspond to completely different operation points in the BER-SNR curve as compared to the first data block 830 to again estimate the tape/head spacing; or the second block tape sections 870A-870D can have one or more operation points in common with what is provided within the first data block 830.

Additionally, in some embodiments, as shown in FIG. 8, the tape head cleaning section 830F can be positioned substantially between the first data block 830 and the second data block 870 along a length 818L (measured in the direction illustrated with a double-headed arrow in FIG. 8) of the diagnostic tape 818. Moreover, in certain such embodiments, the tape head cleaning section 830F can be positioned substantially or directly adjacent to one or both of the first data block 830 and the second data block 870, i.e. along a length 818L of the diagnostic tape 818. Alternatively, the tape head cleaning section 830F can be positioned in a different manner relative to the first data block 830 and/or the second data block 870.

The tape/head spacing estimation provided by the second data block 870 can be compared to the previous tape/head spacing estimation provided by the first data block 830 to effectively evaluate the quality of work done by the tape head cleaning section 830F. In one embodiment, the difference between the estimates can serve as the magnitude of the quality of the work done by the tape head cleaning section 830F. Alternatively, other suitable measures can be devised and used in order to evaluate the quality of the work done by the tape head cleaning section 830F.

Figure 9:
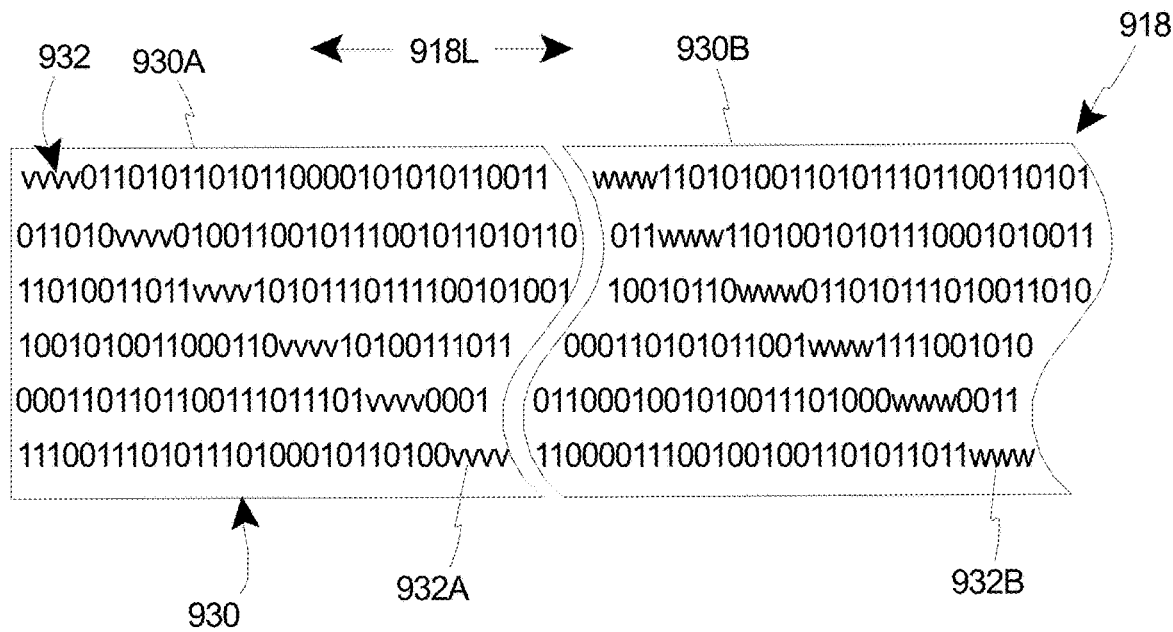
FIG. 9 is a simplified schematic illustration of a portion of another embodiment of the diagnostic tape.

FIG. 9 is a simplified schematic illustration of a portion of another embodiment of the diagnostic tape 918. As illustrated in FIG. 9, the diagnostic tape 918 is somewhat similar to the diagnostic tape 418 illustrated and described herein above in relation to FIG. 4. For example, the diagnostic tape 918 again includes a plurality of tape sections 930, with each tape section 930 having a different patterned code 932 that is indicative of a different head-media spacing and/or a different SNR. As with the previous embodiments, it is appreciated that the diagnostic tape 918 can include any suitable number of tape sections 930. Thus, the diagnostic tape 918 in FIG. 9 only illustrating two different tape sections 930 is not intended to be limiting in any manner.

As shown in FIG. 9, the layout of the patterned data codes 932 along the length 918L (measured in the direction illustrated with a double-headed arrow in FIG. 9) of the diagnostic tape 918 is somewhat different than in the previous embodiments. In particular, as illustrated, the formatted data that is included in each patterned data code 932 within each tape section 930 is still interspersed with unformatted data, but the formatted data is laid out predominantly diagonally as one moves from track-to-track on the diagnostic tape 918.

For example, in FIG. 9, the first tape section 930A includes a first patterned data code 932A with formatted data (illustrated with a series of v's) that is arranged predominantly diagonally (i.e. slanting downward left-to-right in FIG. 9) interspersed with the unformatted data (illustrated as a series of 0's and 1's) as one moves along the length 918L of the diagnostic tape 918. Somewhat similarly, the second tape section 930B includes a second patterned data code 932B with formatted data (illustrated with a series of w's) that is arranged predominantly diagonally (i.e. slanting downward left-to-right in FIG. 9) interspersed with the unformatted data (illustrated as a series of 0's and 1's) as one moves along the length 918L of the diagnostic tape 918.

As noted above, in such embodiments, by using a predominantly diagonal pattern for the formatted data within each tape section 930A-930B, the diagnostic tape 918 can be utilized to individually and independently measure or evaluate the health of the individual tape heads/channels within the tape drive 310 (illustrated in FIG. 3).

Figure 10:
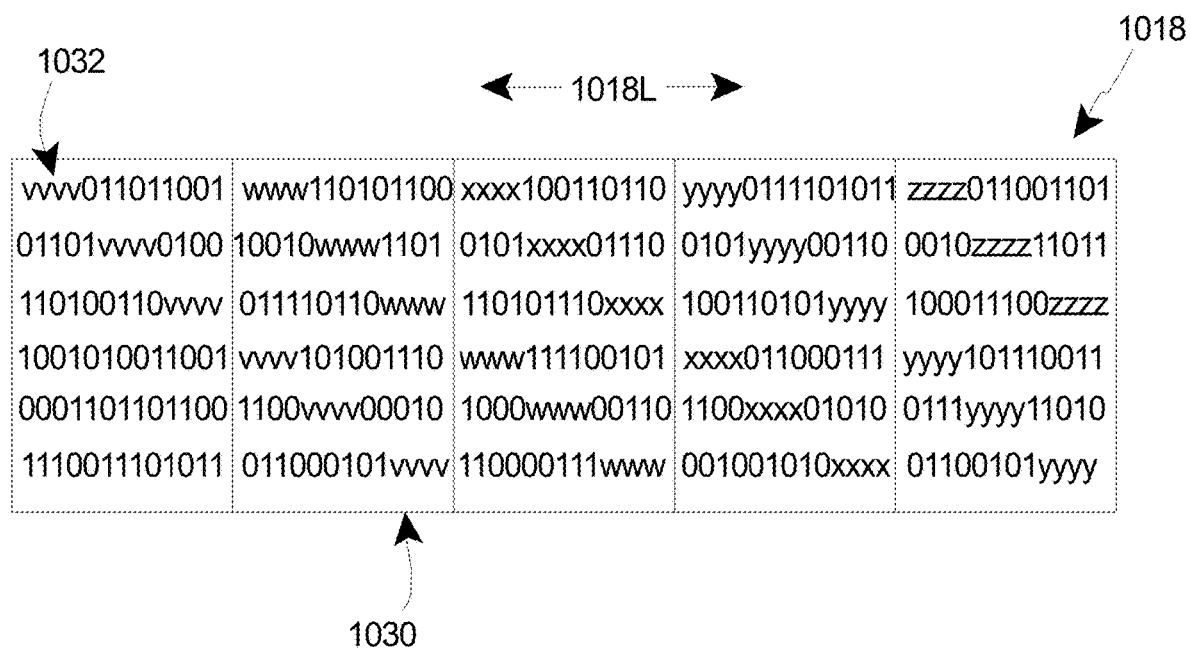
FIG. 10 is a simplified schematic illustration of a portion of still yet another embodiment of the diagnostic tape.

FIG. 10 is a simplified schematic illustration of a portion of still yet another embodiment of the diagnostic tape 1018. As illustrated in FIG. 10, the diagnostic tape 1018 is somewhat similar to the diagnostic tape 918 illustrated and described herein above in relation to FIG. 9. For example, the diagnostic tape 1018 again includes a plurality of tape sections 1030, and a plurality of different patterned codes 1032 that are indicative of different head-media spacings and/or different SNRs.

Additionally, each patterned data code 1032 again includes formatted data (illustrated with a series of v's, w's, x's, y's and z's) that is arranged predominantly diagonally (i.e. slanting downward left-to-right in FIG. 10) interspersed with the unformatted data (illustrated as a series of 0's and 1's) as one moves along the length 1018L (measured in the direction illustrated with a double-headed arrow in FIG. 10) of the diagnostic tape 1018. However, in this embodiment, the patterned data codes 1032 are provided in somewhat overlapping blocks as one moves along the length 1018L of the diagnostic tape 1018. With such design, at any given moment, the diagnostic tape 1018 can be testing one tape head/channel at one operation point, and testing another tape head/channel at another operation point along the appropriate curve. It is appreciated that with such design, the diagnostic tape 1018, by using a predominantly diagonal pattern for the formatted data within each patterned data code 1032, can again be utilized to individually and independently measure or evaluate the health of the individual tape heads/channels within the tape drive 310 (illustrated in FIG. 3). Additionally, it is further appreciated that with such design, it is possible to identify specifically failing, e.g., broken or damaged, individual tape heads within the overall tape drive 310. Thus, it may be possible in certain applications to remove and replace individual tape heads that have been so identified, rather than having to replace the entire tape drive 310.

It is understood that although a number of different embodiments of the diagnostic tape cartridge 312 and the diagnostic tape 318 have been illustrated and described herein, one or more features of any one embodiment can be combined with one or more features of one or more of the other embodiments, provided that such combination satisfies the intent of the present invention.

While a number of exemplary aspects and embodiments of the diagnostic tape cartridge 312 and the diagnostic tape 318 have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A diagnostic tape for use with a tape drive having a tape head, the diagnostic tape comprising:
a first tape section that is configured to move across the tape head during use of the tape drive, the first tape section including a first patterned data code that is indicative of a first spacing between the tape head and the first tape section; and
a second tape section that is configured to move across the tape head during use of the tape drive, the second tape section including a second patterned data code that is indicative of a second spacing between the tape head and the second tape section, the second patterned data code being different than the first patterned data code; and
wherein at least one of the first patterned data code and the second patterned data code includes formatted data that is interspersed with unformatted data.

2. The diagnostic tape of claim 1 wherein each of the first patterned data code and the second patterned data code includes formatted data that is interspersed with unformatted data.

3. The diagnostic tape of claim 2 wherein the formatted data is arranged diagonally along a length of the diagnostic tape.

4. The diagnostic tape of claim 1 further comprising a third tape section that is configured to move across the tape head during use of the tape drive, the third tape section including a third patterned data code that is indicative of a third spacing between the tape head and the third tape section, the third patterned data code being different than the first patterned data code and the second patterned data code.

5. The diagnostic tape of claim 1 wherein the tape drive further includes a servo head, the diagnostic tape further comprising a third tape section that is configured to move across the servo head during use of the tape drive, the third tape section including a third patterned data code that is indicative of a spacing between the servo head and the third tape section, the third patterned data code being different than the first patterned data code and the second patterned data code.

6. The diagnostic tape of claim 1 wherein the first tape section is positioned substantially adjacent to the second tape section along a length of the diagnostic tape.

7. A combination including a tape drive having a tape head, and the diagnostic tape of claim 1 that is selectively usable within the tape drive.

8. The combination of claim 7 wherein the tape head is configured to (i) read the first patterned data code from the first tape section to generate first information relevant to an actual spacing between the tape head and the diagnostic tape, and (ii) read the second patterned data code from the second tape section to generate second information relevant to the actual spacing between the tape head and the diagnostic tape.

9. The combination of claim 8 further comprising a controller including a processor that is configured to estimate the actual spacing between the tape head and the diagnostic tape, the actual spacing being based at least partially upon the first information and the second information.

10. A diagnostic tape for use with a tape drive having a tape head, the diagnostic tape comprising:
a first tape section that is configured to move across the tape head during use of the tape drive, the first tape section including a first patterned data code that is indicative of a first spacing between the tape head and the first tape section;
a second tape section that is configured to move across the tape head during use of the tape drive, the second tape section including a second patterned data code that is indicative of a second spacing between the tape head and the second tape section, the second patterned data code being different than the first patterned data code; and
a tape head cleaning section that is configured to move across the tape head during use of the tape drive, the tape head cleaning section being configured to clean the tape head as the tape head cleaning section moves across the tape head.

11. The diagnostic tape of claim 10 wherein the tape head cleaning section includes abrasive material formed along a surface of the diagnostic tape.

12. The diagnostic tape of claim 10 wherein the tape head cleaning section includes diamond-like abrasive material formed along a surface of the diagnostic tape.

13. The diagnostic tape of claim 10 wherein the tape head cleaning section includes wavy lapping tape.

14. The diagnostic tape of claim 10 wherein the first tape section is positioned adjacent to the second tape section along a length of the diagnostic tape; and wherein the tape head cleaning section is positioned after the first tape section and the second tape section along the length of the diagnostic tape.

15. The diagnostic tape of claim 14 wherein the first tape section and the second tape section comprise a first data block; wherein the diagnostic tape further comprises a second data block that includes a plurality of second block tape sections, with each second block tape section having a different patterned data code that is indicative of a different spacing between the tape head and the respective second block tape section; and wherein the tape head cleaning section is positioned between the first data block and the second data block along the length of the diagnostic tape.

16. A method for estimating an actual spacing between a tape and a tape head during use of a tape drive that includes the tape head, the method comprising the steps of:
    providing a diagnostic tape including (i) a first tape section including a first patterned data code that is indicative of a first spacing between the tape head and the first tape section, and (ii) a second tape section including a second patterned data code that is indicative of a second spacing between the tape head and the second tape section, the second patterned data code being different than the first patterned data code, at least one of the first patterned data code and the second patterned data code including formatted data that is interspersed with unformatted data;
    moving the first tape section of the diagnostic tape across the tape head to generate first information; and
    moving the second tape section of the diagnostic tape across the tape head to generate second information.

17. The method of claim 16 wherein the step of providing includes each of the first patterned data code and the second patterned data code including formatted data that is interspersed with unformatted data.

18. The diagnostic tape of claim 17 wherein the step of providing includes the formatted data being arranged diagonally along a length of the diagnostic tape.

19. The method of claim 16 further comprising the step of estimating the actual spacing between the diagnostic tape and the tape head with a controller including a processor, the estimation of the actual spacing being based at least partially upon the first information and the second information.

20. The method of claim 16 wherein the step of providing further includes the diagnostic tape including a third tape section including a third patterned data code that is indicative of a third spacing between the tape head and the third tape section, the third patterned data code being different than the first patterned data code and the second patterned data code; the method further comprising the steps of moving the third tape section of the diagnostic tape across the tape head to generate third information; and estimating the actual spacing between the diagnostic tape and the tape head with a controller including a processor, the estimation of the actual spacing being based at least partially upon the first information, the second information and the third information.

21. The method of claim 16 wherein the tape drive further includes a servo head; and wherein the step of providing further includes the diagnostic tape including a third tape section including a third patterned data code that is indicative of a spacing between the servo head and the third tape section, the third patterned data code being different than the first patterned data code and the second patterned data code; the method further comprising the steps of moving the third tape section of the diagnostic tape across the servo head to generate third information; and estimating the actual spacing between the diagnostic tape and the servo head with a controller including a processor, the estimation of the actual spacing being based at least partially upon the third information.

22. The method of claim 16 wherein the step of providing further includes the diagnostic tape including a tape head cleaning section including material formed along a surface of the diagnostic tape; and wherein the method further comprises the step of moving the tape head cleaning section of the diagnostic tape across the tape head to clean the tape head.

23. The method of claim 22 wherein the step of providing includes the tape head cleaning section including one of abrasive material formed along the surface of the diagnostic tape, diamond-like abrasive material formed along the surface of the diagnostic tape, and wavy lapping tape.

24. The method of claim 22 wherein the step of providing includes positioning the first tape section adjacent to the second tape section along a length of the diagnostic tape, and positioning the tape head cleaning section after the first tape section and the second tape section along the length of the diagnostic tape.

25. The method of claim 24 wherein the step of providing includes (i) the first tape section and the second tape section comprising a first data block; (ii) the diagnostic tape further including a second data block including a plurality of second block tape sections, with each second block tape section having a different patterned data code that is indicative of a different spacing between the tape head and the respective second block tape section; and (iii) positioning the tape head cleaning section between the first data block and the second data block along the length of the diagnostic tape.

26. The method of claim 16 wherein the step of providing includes positioning the first tape section substantially adjacent to the second tape section along a length of the diagnostic tape.

* * * * *